US012626415B2

(12) United States Patent
Shi et al.

(10) Patent No.: US 12,626,415 B2
(45) Date of Patent: May 12, 2026

(54) VIDEO FRAME COMPRESSION METHOD, VIDEO FRAME DECOMPRESSION METHOD, AND APPARATUS

(71) Applicant: Huawei Technologies Co., Ltd., Shenzhen (CN)

(72) Inventors: Yibo Shi, Beijing (CN); Jing Wang, Beijing (CN); Yunying Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 18/316,750

(22) Filed: May 12, 2023

(65) Prior Publication Data
US 2023/0281881 A1     Sep. 7, 2023

Related U.S. Application Data

(63) Continuation     of     application     No. PCT/CN2021/112077, filed on Aug. 11, 2021.

(30) Foreign Application Priority Data

Nov. 13, 2020     (CN) .......................... 202011271217.8

(51) Int. Cl.
G06T 9/00           (2006.01)
(52) U.S. Cl.
CPC .................................... G06T 9/002 (2013.01)
(58) Field of Classification Search
CPC .......... G06T 9/002; G06N 3/04; G06N 3/044;
G06N 3/045; G06N 3/047; G06N 3/048;
(Continued)

(56) References Cited

U.S. PATENT DOCUMENTS 5,134,396 A *     7/1992     Sirat ................... G06F 18/2135
                                                               341/51
2020/0053388 A1*   2/2020   Schroers .............. H04N 19/537
(Continued)

FOREIGN PATENT DOCUMENTS

CN          110401836 A       11/2019
CN          114501031 A       5/2022
(Continued)

OTHER PUBLICATIONS

Lu, G., et al., "An End-to-End Learning Framework for Video Compression," Journal of Latex Class Files, vol. 14, No. 8, Aug. 2015, 18 pages.
(Continued)

*Primary Examiner* — Jianxun Yang
(74) *Attorney, Agent, or Firm* — Conley Rose, P.C.

(57)           ABSTRACT
A video frame compression method includes determining a target neural network from a plurality of neural networks according to a network selection policy; and generating, by using the target neural network, compression information corresponding to a current video frame. If the compression information is obtained by using a first neural network, the compression information includes first compression information of a first feature of the current video frame, and a reference frame of the current video frame is used for a compression process of the first feature of the current video frame. If the compression information is obtained by using a second neural network, the compression information includes second compression information of a second feature of the current video frame, and a reference frame of the current video frame is used for a generation process of the second feature of the current video frame.

20 Claims, 18 Drawing Sheets

Current video frame

(58) Field of Classification Search
CPC .......... G06N 3/08; G06N 3/084; G06N 3/088;
G06N 3/02; H04N 19/103; H04N 19/136;
H04N 19/61; H04N 19/124; H04N 19/91
See application file for complete search history.

(56) References Cited

U.S. PATENT DOCUMENTS

| | | |
|---|---|---|
| 2020/0059669 A1 | 2/2020 | Nishi et al. |
| 2020/0327701 A1 * | 10/2020 | Zhou ...................... H04N 19/46 |
| 2022/0264095 A1 | 8/2022 | Galpin et al. |

FOREIGN PATENT DOCUMENTS

| | | |
|---|---|---|
| JP | H02303220 A | 12/1990 |
| JP | 2021520087 A | 8/2021 |
| WO | 2017036370 A1 | 3/2017 |
| WO | 2018199051 A1 | 11/2018 |
| WO | 2019209913 A1 | 10/2019 |
| WO | 2021097421 A1 | 5/2021 |

OTHER PUBLICATIONS

Ladune et al., "Modenet: Mode Selection Network for Learned Video Coding," 2020 IEEE International Workshop on Machine Learning for Signal Processing, Sep. 21-24, 2020, Espoo, Finland, 6 pages.

* cited by examiner

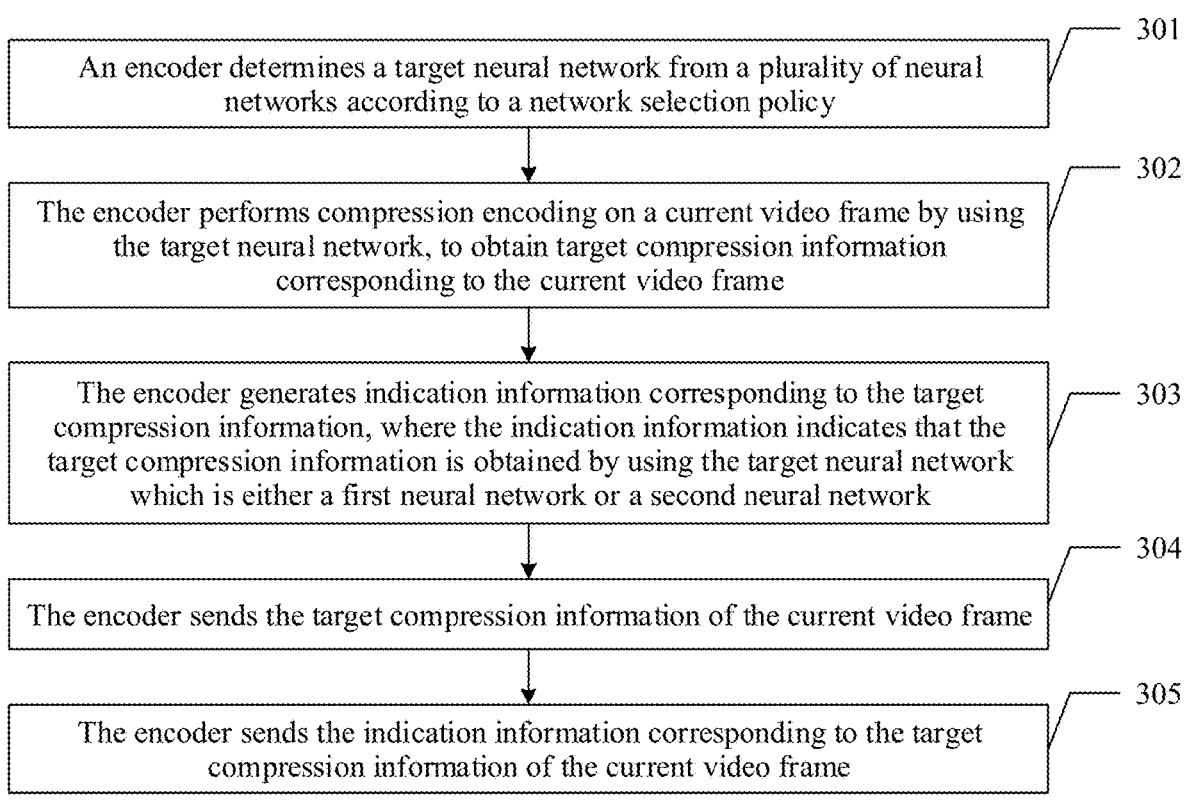

An encoder determines a target neural network from a plurality of neural networks according to a network selection policy — 301

The encoder performs compression encoding on a current video frame by using the target neural network, to obtain target compression information corresponding to the current video frame — 302

The encoder generates indication information corresponding to the target compression information, where the indication information indicates that the target compression information is obtained by using the target neural network which is either a first neural network or a second neural network — 303

The encoder sends the target compression information of the current video frame — 304

The encoder sends the indication information corresponding to the target compression information of the current video frame — 305

FIG. 3

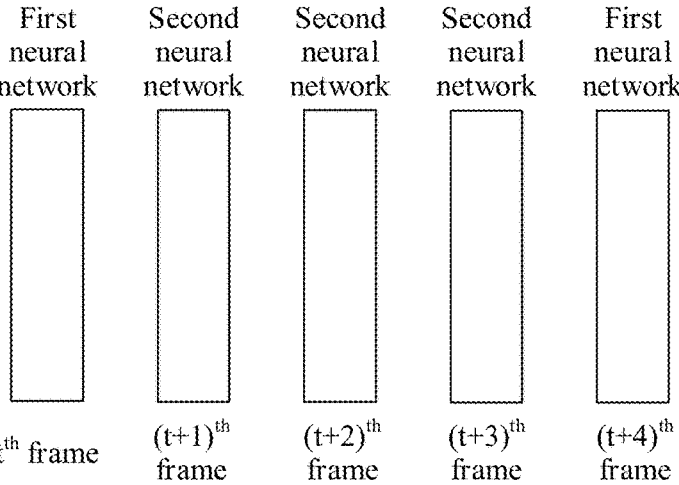

First neural network    Second neural network    Second neural network    Second neural network    First neural network $t^{th}$ frame    $(t+1)^{th}$ frame    $(t+2)^{th}$ frame    $(t+3)^{th}$ frame    $(t+4)^{th}$ frame

FIG. 4

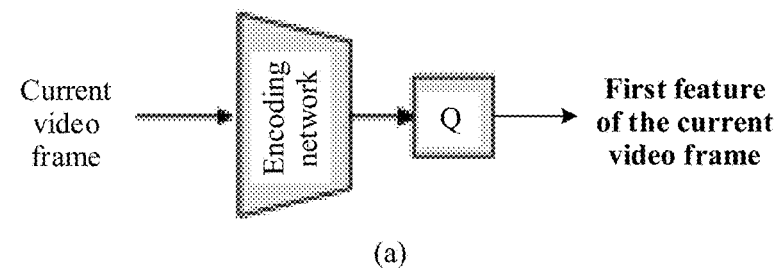
(a)
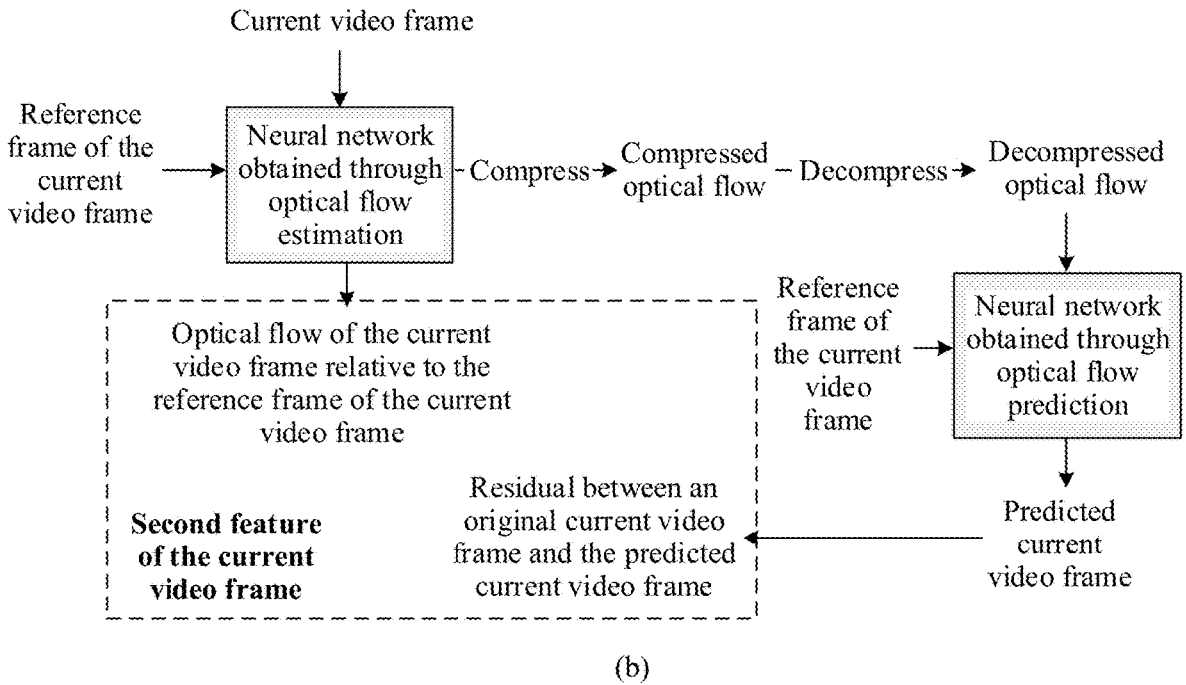
(b)
FIG. 5C

Current video frame

Current video frame

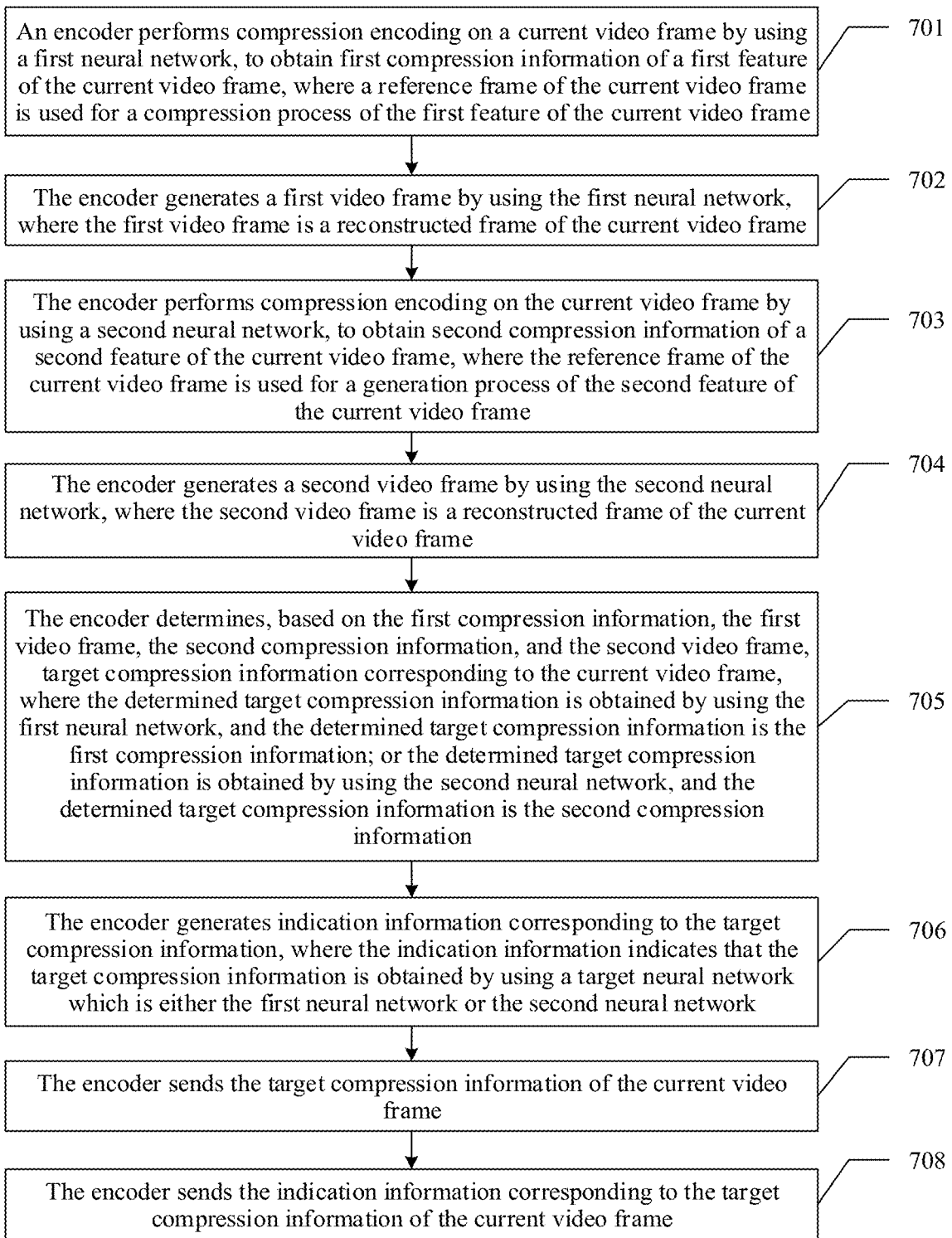

An encoder performs compression encoding on a current video frame by using a first neural network, to obtain first compression information of a first feature of the current video frame, where a reference frame of the current video frame is used for a compression process of the first feature of the current video frame — 701

The encoder generates a first video frame by using the first neural network, where the first video frame is a reconstructed frame of the current video frame — 702

The encoder performs compression encoding on the current video frame by using a second neural network, to obtain second compression information of a second feature of the current video frame, where the reference frame of the current video frame is used for a generation process of the second feature of the current video frame — 703

The encoder generates a second video frame by using the second neural network, where the second video frame is a reconstructed frame of the current video frame — 704

The encoder determines, based on the first compression information, the first video frame, the second compression information, and the second video frame, target compression information corresponding to the current video frame, where the determined target compression information is obtained by using the first neural network, and the determined target compression information is the first compression information; or the determined target compression information is obtained by using the second neural network, and the determined target compression information is the second compression information — 705

The encoder generates indication information corresponding to the target compression information, where the indication information indicates that the target compression information is obtained by using a target neural network which is either the first neural network or the second neural network — 706

The encoder sends the target compression information of the current video frame — 707

The encoder sends the indication information corresponding to the target compression information of the current video frame — 708

FIG. 7A

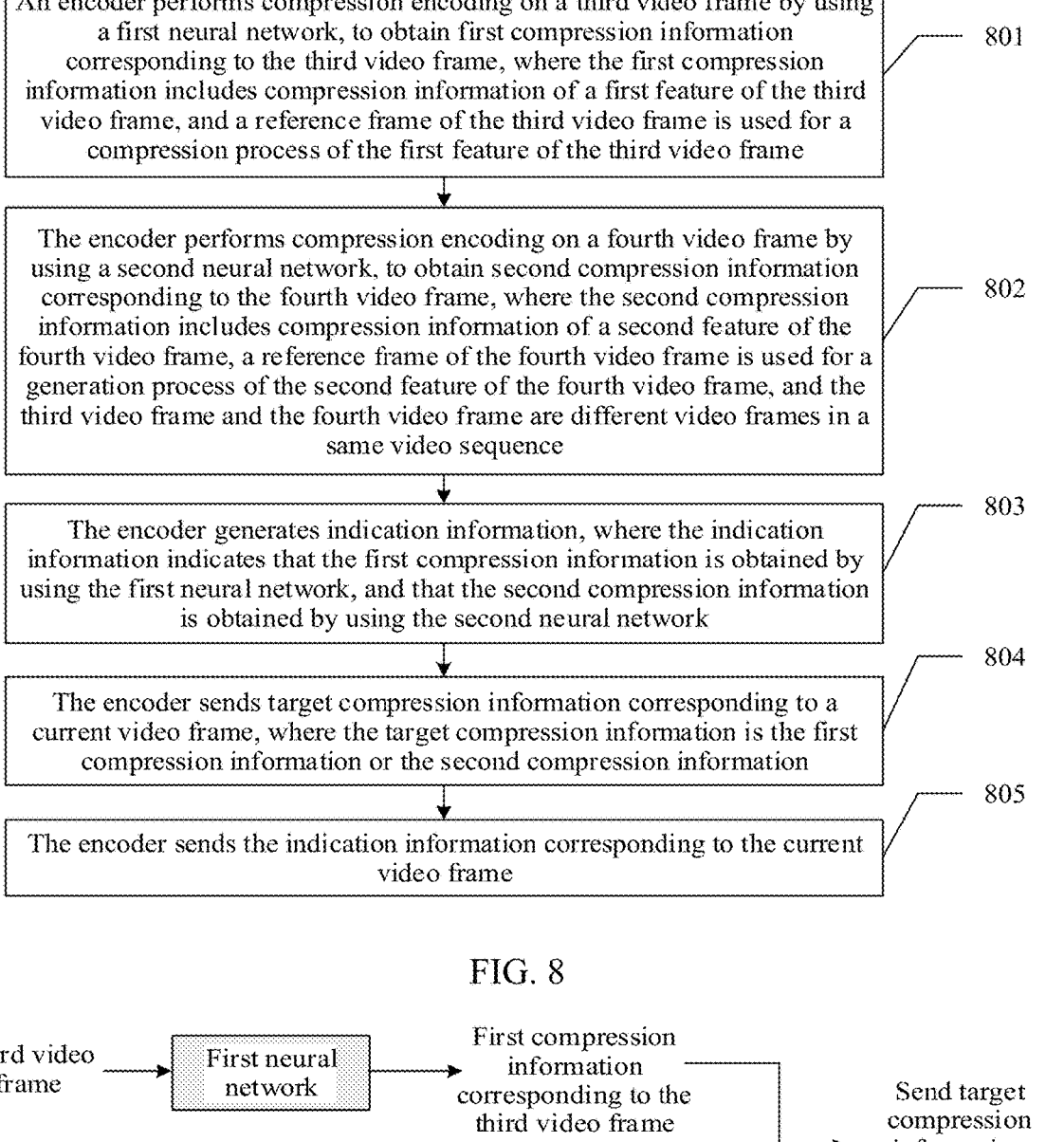

An encoder performs compression encoding on a third video frame by using a first neural network, to obtain first compression information corresponding to the third video frame, where the first compression information includes compression information of a first feature of the third video frame, and a reference frame of the third video frame is used for a compression process of the first feature of the third video frame ⟋— 801

The encoder performs compression encoding on a fourth video frame by using a second neural network, to obtain second compression information corresponding to the fourth video frame, where the second compression information includes compression information of a second feature of the fourth video frame, a reference frame of the fourth video frame is used for a generation process of the second feature of the fourth video frame, and the third video frame and the fourth video frame are different video frames in a same video sequence ⟋— 802

The encoder generates indication information, where the indication information indicates that the first compression information is obtained by using the first neural network, and that the second compression information is obtained by using the second neural network ⟋— 803

The encoder sends target compression information corresponding to a current video frame, where the target compression information is the first compression information or the second compression information ⟋— 804

The encoder sends the indication information corresponding to the current video frame ⟋— 805

FIG. 8

Third video frame → First neural network → First compression information corresponding to the third video frame ⟶ Send target compression information corresponding to a current video frame Fourth video frame → Second neural network → Second compression information corresponding to the fourth video frame

FIG. 9

A decoder receives target compression information corresponding to at least one current video frame
—— 1001

The decoder receives indication information corresponding to the target compression information
—— 1002

The decoder selects, from a plurality of neural networks, a target neural network corresponding to the current video frame, where the plurality of neural networks include a third neural network and a fourth neural network
—— 1003

The decoder performs decompression based on the target compression information by using the target neural network, to obtain a reconstructed frame of the current video frame, where if the target neural network is the third neural network, the target compression information includes first compression information of a first feature of the current video frame, a reference frame of the current video frame is used for a decompression process of the first compression information, to obtain the first feature of the current video frame, and the first feature of the current video frame is used for a generation process of the reconstructed frame of the current video frame; or if the target neural network is the fourth neural network, the target compression information includes second compression information of a second feature of the current video frame, the second compression information is used by the decoder to perform decompression, to obtain the second feature of the current video frame, and a reference frame of the current video frame and the second feature of the current video frame are used for a generation process of the reconstructed frame of the current video frame
—— 1004

FIG. 10A

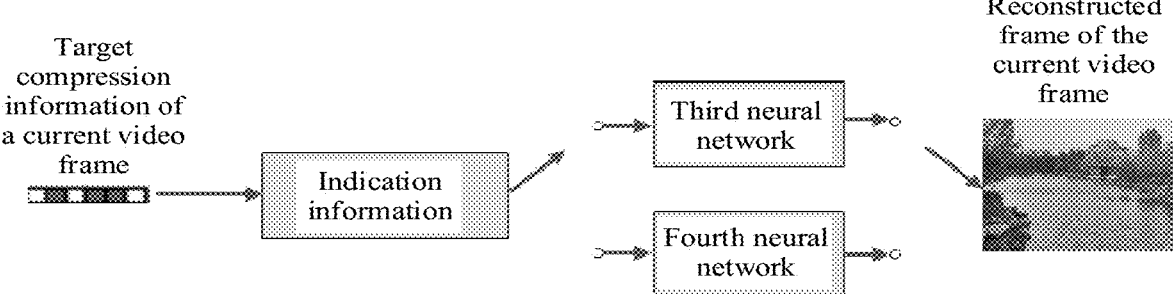

FIG. 10B

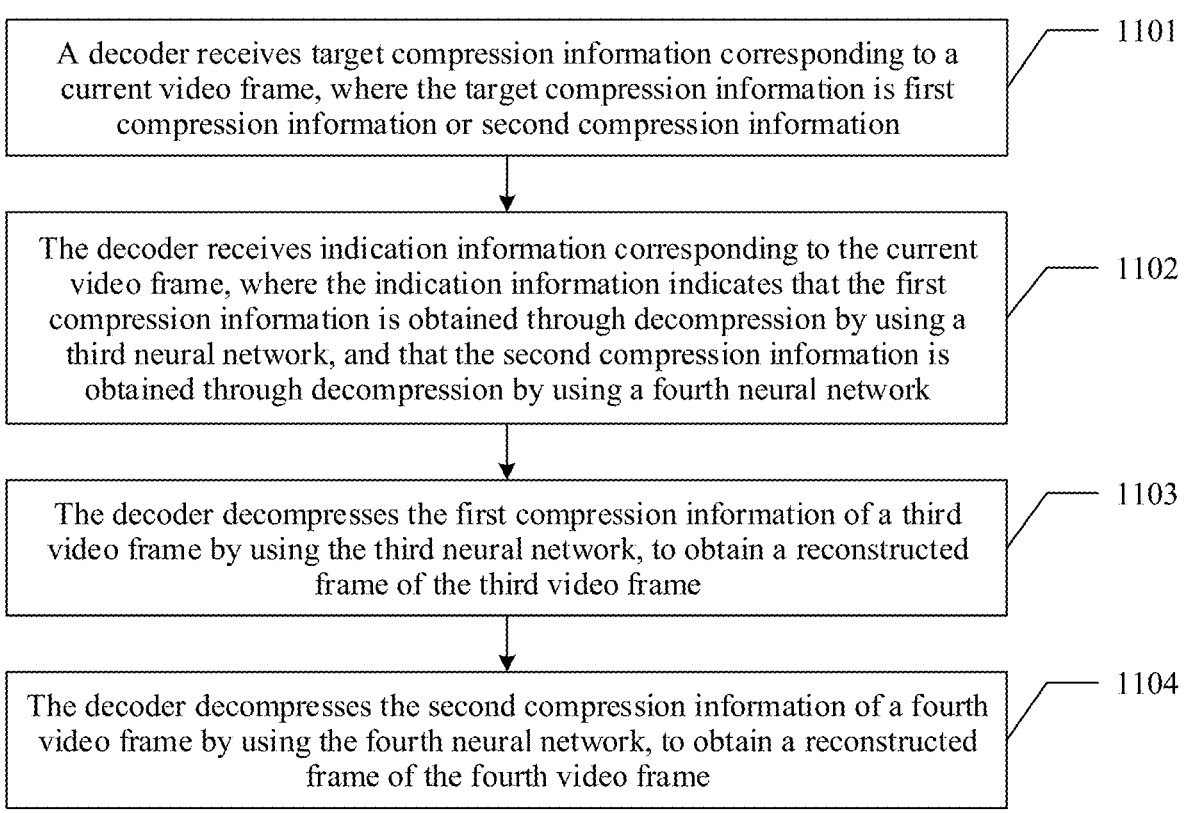

A decoder receives target compression information corresponding to a current video frame, where the target compression information is first compression information or second compression information ⟋— 1101

The decoder receives indication information corresponding to the current video frame, where the indication information indicates that the first compression information is obtained through decompression by using a third neural network, and that the second compression information is obtained through decompression by using a fourth neural network ⟋— 1102

The decoder decompresses the first compression information of a third video frame by using the third neural network, to obtain a reconstructed frame of the third video frame ⟋— 1103

The decoder decompresses the second compression information of a fourth video frame by using the fourth neural network, to obtain a reconstructed frame of the fourth video frame ⟋— 1104

FIG. 11

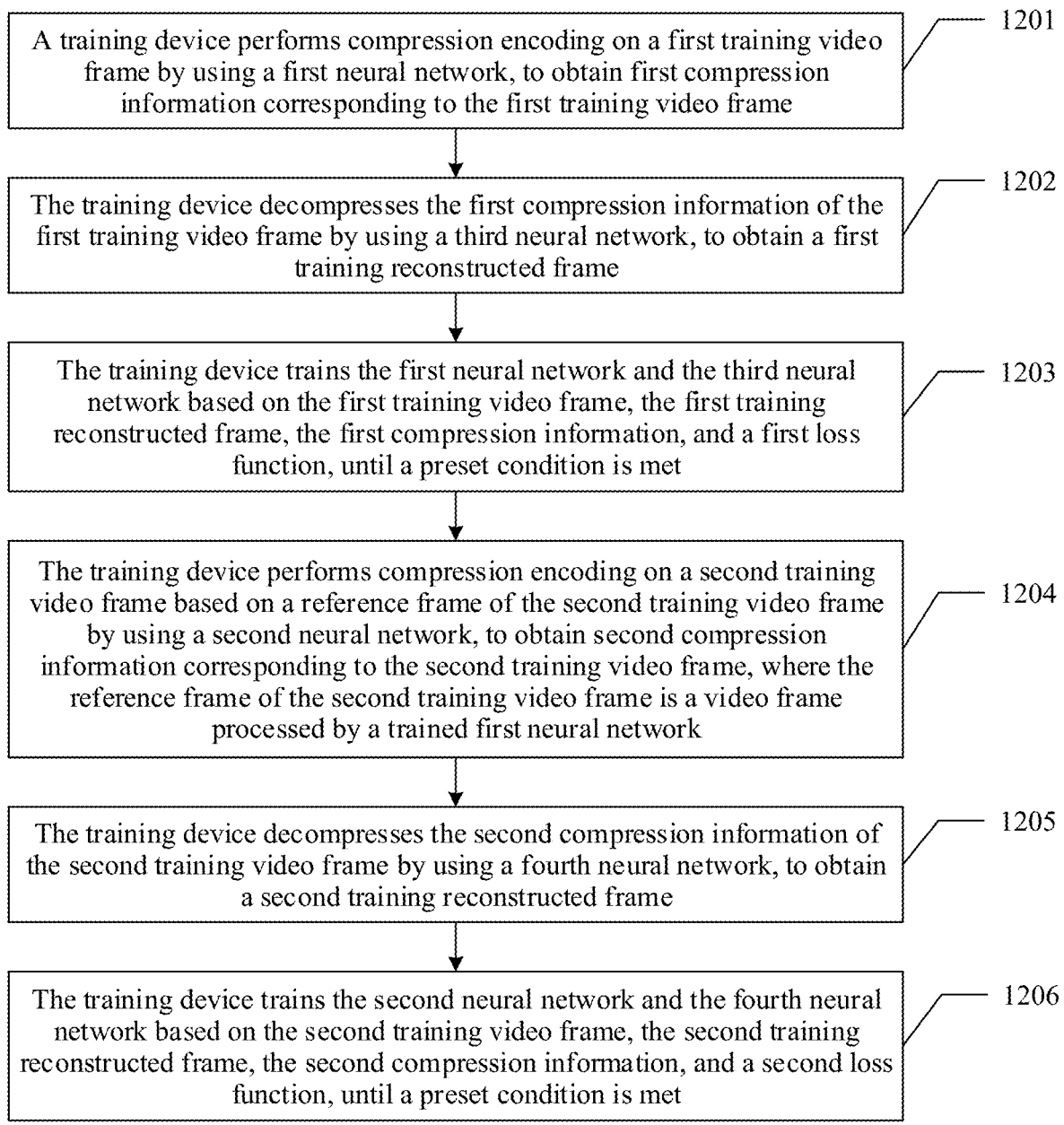

A training device performs compression encoding on a first training video frame by using a first neural network, to obtain first compression information corresponding to the first training video frame — 1201

The training device decompresses the first compression information of the first training video frame by using a third neural network, to obtain a first training reconstructed frame — 1202

The training device trains the first neural network and the third neural network based on the first training video frame, the first training reconstructed frame, the first compression information, and a first loss function, until a preset condition is met — 1203

The training device performs compression encoding on a second training video frame based on a reference frame of the second training video frame by using a second neural network, to obtain second compression information corresponding to the second training video frame, where the reference frame of the second training video frame is a video frame processed by a trained first neural network — 1204

The training device decompresses the second compression information of the second training video frame by using a fourth neural network, to obtain a second training reconstructed frame — 1205

The training device trains the second neural network and the fourth neural network based on the second training video frame, the second training reconstructed frame, the second compression information, and a second loss function, until a preset condition is met — 1206

Video coding device

Processor

Coding module

470

Receiver
unit

Transmitter
unit

460 Memory

Downlink port

Uplink port

500

502 518

Processor Display

512

Data 506

Application: 1...

Application: video coding 510

Application: ... N

Operating system 508

504

VIDEO FRAME COMPRESSION METHOD, VIDEO FRAME DECOMPRESSION METHOD, AND APPARATUS

CROSS-REFERENCE TO RELATED APPLICATIONS

This is a continuation of International Patent Application No. PCT/CN2021/112077 filed on Aug. 11, 2021, which claims priority to Chinese Patent Application No. 202011271217.8 filed on Nov. 13, 2020. The disclosures of the aforementioned applications are hereby incorporated by reference in their entireties.

TECHNICAL FIELD

This application relates to the field of artificial intelligence, and in particular, to a video frame compression method, a video frame decompression method, and an apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions.

Currently, a common application manner of artificial intelligence is to compress a video frame by using a neural network based on deep learning. Specifically, an encoder calculates an optical flow of a current video frame relative to a reference frame of the current video frame by using the neural network, to generate an optical flow of an original current video frame relative to the reference frame. The encoder performs compression encoding on the optical flow, to obtain a compressed optical flow. Both the reference frame of the current video frame and the current video frame belong to a current video sequence, and the reference frame of the current video frame is a video frame that needs to be referred to when compression encoding is performed on the current video frame. The compressed optical flow is decompressed, to obtain a decompressed optical flow, and a predicted current video frame is generated based on the decompressed optical flow and the reference frame. The neural network is used to calculate a residual between the original current video frame and the predicted current video frame, and compression encoding is performed on the residual. The compressed optical flow and a compressed residual are sent to a decoder. Therefore, the decoder may obtain, by using the neural network, a decompressed current video frame based on a decompressed reference frame, the decompressed optical flow, and a decompressed residual.

The process of obtaining the decompressed video frame by using the neural network depends excessively on quality of the decompressed reference frame, and errors are accumulated frame by frame. Therefore, a solution for improving quality of a reconstructed frame of a video frame is urgently required.

SUMMARY

This application provides a video frame compression method, a video frame decompression method, and an apparatus. When compression information is obtained by using a first neural network, quality of a reconstructed frame of a current video frame does not depend on quality of a reconstructed frame of a reference frame of the current video frame, to prevent errors from being accumulated frame by frame, and improve quality of the reconstructed frame of the video frame. In addition, advantages of the first neural network and a second neural network are combined, to minimize a data amount that needs to be transmitted, and improve quality of the reconstructed frame of the video frame.

To resolve the foregoing technical problem, this application provides the following technical solutions.

According to a first aspect, this application provides a video frame compression method. In the method, an artificial intelligence technology may be applied to the field of video frame encoding/decoding. The method may include: An encoder determines a target neural network from a plurality of neural networks according to a network selection policy, where the plurality of neural networks include a first neural network and a second neural network; and performs compression encoding on a current video frame by using the target neural network, to obtain compression information corresponding to the current video frame.

If the compression information is obtained by using the first neural network, the compression information includes first compression information of a first feature of the current video frame, a reference frame of the current video frame is used for a compression process of the first feature of the current video frame, and the reference frame of the current video frame is not used for a generation process of the first feature of the current video frame. In other words, the first feature of the current video frame can be obtained only based on the current video frame, and the reference frame of the current video frame is not needed in the generation process of the first feature of the current video frame. If the compression information is obtained by using the second neural network, the compression information includes second compression information of a second feature of the current video frame, and a reference frame of the current video frame is used for a generation process of the second feature of the current video frame.

The current video frame is an original video frame included in a current video sequence. The reference frame of the current video frame may be or may not be an original video frame in the current video sequence. The reference frame of the current video frame may be a video frame obtained after transform encoding is performed on an original reference frame by using an encoding network, and then inverse transform decoding is performed by using a decoding network. Alternatively, the reference frame of the current video frame is a video frame obtained after the encoder performs compression encoding and decompression on an original reference frame.

In this implementation, when the compression information is obtained by using the first neural network, the compression information carries the compression information of the first feature of the current video frame, and the reference frame of the current video frame is used only for the compression process of the first feature of the current video frame, and is not used for the generation process of the first feature of the current video frame. Therefore, after a decoder performs decompression based on the first compression information, to obtain the first feature of the current video frame, a reconstructed frame of the current video frame can be obtained without the reference frame of the current video frame. Therefore, when the compression information is obtained by using the first neural network, quality of the reconstructed frame of the current video frame does not depend on quality of a reconstructed frame of the reference frame of the current video frame, to prevent errors from being accumulated frame by frame, and improve quality of the reconstructed frame of the video frame. In addition, because the second feature of the current video frame is generated based on the reference frame of the current video frame, and a data amount corresponding to the second compression information of the second feature is less than a data amount corresponding to the first compression information of the first feature, the encoder may process different video frames in the current video sequence by using the first neural network and the second neural network, to combine advantages of the first neural network and the second neural network, so as to minimize a data amount that needs to be transmitted, and improve quality of the reconstructed frame of the video frame.

In a possible implementation of the first aspect, the first neural network includes an encoding network and an entropy encoding layer, the encoding network is used to obtain the first feature of the current video frame from the current video frame, and the entropy encoding layer is used to perform entropy encoding on the first feature of the current video frame, to output the first compression information. Further, the first feature of the current video frame is obtained after transform encoding and quantization are performed on the current video frame by using a first encoding network, where quantization is performed after transform encoding.

In a possible implementation of the first aspect, the second neural network includes a convolutional network and an entropy encoding layer, the convolutional network includes a plurality of convolutional layers and an activation ReLU layer, the convolutional network is used to obtain a residual of the current video frame based on the reference frame of the current video frame, and the entropy encoding layer is used to perform entropy encoding on the residual of the current video frame, to output the second compression information.

In a possible implementation of the first aspect, if the compression information is obtained by using the second neural network, that the encoder performs compression encoding on a current video frame by using the target neural network, to obtain compression information corresponding to the current video frame may include: The encoder generates an optical flow of the original current video frame relative to the reference frame of the current video frame, and performs compression encoding on the optical flow, to obtain a compressed optical flow. The second feature of the current video frame includes the optical flow of the original current video frame relative to the reference frame of the current video frame.

Optionally, the encoder may further decompress the compressed optical flow, to obtain a decompressed optical flow; generate a predicted current video frame based on the decompressed optical flow and the reference frame of the current video frame; and calculate a residual between the original current video frame and the predicted current video frame. The second feature of the current video frame includes the optical flow of the original current video frame relative to the reference frame of the current video frame and the residual between the original current video frame and the predicted current video frame.

In a possible implementation of the first aspect, the network selection policy is related to any one or more of the following factors: location information of the current video frame or a data amount carried in the current video frame.

In a possible implementation of the first aspect, that an encoder determines a target neural network from a plurality of neural networks according to a network selection policy includes: The encoder obtains the location information of the current video frame in the current video sequence. The location information indicates that the current video frame is an $X^{th}$ frame in the current video sequence, the location information of the current video frame in the current video sequence may specifically be represented as an index number, and the index number may specifically be represented as a character string. The encoder selects the target neural network from the plurality of neural networks based on the location information. Alternatively, that an encoder determines a target neural network from a plurality of neural networks according to a network selection policy includes: The encoder selects the target neural network from the plurality of neural networks based on an attribute of the current video frame. The attribute of the current video frame indicates the data amount carried in the current video frame, and the attribute of the current video frame includes any one or any combination of the following: an entropy, contrast, and saturation of the current video frame.

In this implementation, the target neural network is selected from the plurality of neural networks based on the location information of the current video frame in the current video sequence. Alternatively, the target neural network may be selected from the plurality of neural networks based on at least one attribute of the current video, to generate the compression information of the current video frame by using the target neural network. This provides a plurality of implementation solutions that are simple and easy to operate, and improves implementation flexibility of the solution.

In a possible implementation of the first aspect, the method may further include: The encoder generates and sends at least one piece of indication information that one-to-one corresponds to one or more pieces of compression information. Each piece of indication information indicates that one piece of compression information is obtained by using the target neural network which is either the first neural network or the second neural network. In other words, the piece of indication information indicates that either the first neural network or the second neural network is used to obtain the piece of compression information.

In this implementation, the decoder can obtain a plurality of pieces of indication information corresponding to the plurality of pieces of compression information, so that the decoder can learn of that either the first neural network or the second neural network is used to decompress each video frame in the current video sequence. This helps reduce time for the decoder to decode the compression information. In other words, this helps improve efficiency of entire video frame transmission performed by the encoder and the decoder.

In a possible implementation of the first aspect, if the compression information is obtained by using the first neural network, that the encoder performs compression encoding on a current video frame by using the target neural network, to obtain compression information corresponding to the current video frame may include: The encoder obtains the first feature of the current video frame from the current video frame by using the encoding network, and predicts, by using the entropy encoding layer, a feature of the current video frame based on the reference frame of the current video frame, to generate a predicted feature of the current video frame. The predicted feature of the current video frame is a predicted result of the first feature of the current video frame, and a data shape of the predicted feature of the current video frame is the same as a data shape of the first feature of the current video frame. The encoder generates, by using the entropy encoding layer, probability distribution of the first feature of the current video frame based on the predicted feature of the current video frame. The probability distribution of the first feature of the current video frame includes a mean of the first feature of the current video frame and a variance of the first feature of the current video frame. The encoder performs entropy encoding, by using the entropy encoding layer, on the first feature of the current video frame based on the probability distribution of the first feature of the current video frame, to obtain the first compression information.

In this implementation, the encoder generates the probability distribution of the first feature of the current video frame based on the predicted feature of the current video frame, and then performs compression encoding on the first feature of the current video frame based on the probability distribution of the first feature of the current video frame, to obtain the first compression information of the current video frame. A higher similarity between the predicted feature of the current video frame and the first feature indicates a larger compression rate of the first feature and smaller first compression information that is finally obtained. The predicted feature of the current video frame is obtained by predicting the feature of the current video frame based on the reference frame of the current video frame, to improve the similarity between the predicted feature of the current video frame and the first feature of the current video frame. This reduces a size of compressed first compression information. In other words, this can ensure quality of the reconstructed frame obtained by the decoder, and reduce a data amount transmitted between the encoder and the decoder.

In a possible implementation of the first aspect, both the first neural network and the second neural network are trained neural networks, and a model parameter of the first neural network is updated according to a first loss function of the first neural network. The first loss function includes a loss term of a similarity between a first training video frame and a first training reconstructed frame and a loss term of a data size of compression information of the first training video frame, and the first training reconstructed frame is a reconstructed frame of the first training video frame. A training objective of the first loss function includes increasing the similarity between the first training video frame and the first training reconstructed frame, and further includes reducing a size of first compression information of the first training video frame. During training the second neural network based on one or more second training video frames, a reference frame of the second training video frame, and a second loss function, the second loss function includes a loss term of a similarity between the second training video frame and a second training reconstructed frame and a loss term of a data size of compression information of the second training video frame. The second training reconstructed frame is a reconstructed frame of the second training video frame, and the reference frame of the second training video frame is a video frame processed by the first neural network. A training objective of the second loss function includes increasing the similarity between the second training video frame and the second training reconstructed frame, and further includes reducing a size of second compression information of the second training video frame.

In this implementation, in an execution phase, because the reference frame used by the second neural network may be processed by the first neural network, the reference frame processed by the first neural network is used to train the second neural network. This helps maintain consistency between a training phase and the execution phase, to improve accuracy of the execution phase.

According to a second aspect, an embodiment of this application provides a video frame compression method. In the method, an artificial intelligence technology may be applied to the field of video frame encoding/decoding. An encoder performs compression encoding on a current video frame by using a first neural network, to obtain first compression information of a first feature of the current video frame, where a reference frame of the current video frame is used for a compression process of the first feature of the current video frame; and generates a first video frame by using the first neural network, where the first video frame is a reconstructed frame of the current video frame.

The encoder performs compression encoding on the current video frame by using a second neural network, to obtain second compression information of a second feature of the current video frame, where the reference frame of the current video frame is used for a generation process of the second feature of the current video frame; and generates a second video frame by using the second neural network, where the second video frame is a reconstructed frame of the current video frame.

The encoder determines, based on the first compression information, the first video frame, the second compression information, and the second video frame, compression information corresponding to the current video frame. The determined compression information is obtained by using the first neural network, and the determined compression information is the first compression information. Alternatively, the determined compression information is obtained by using the second neural network, and the determined compression information is the second compression information.

In this implementation, compression information that finally needs to be sent is selected from the first compression information and the second compression information based on the first compression information of at least one current video frame, the first video frame, the second compression information of the current video frame, and the second video frame. Compared with a manner in which a target neural network is determined from a plurality of neural networks according to a network selection policy, and then target compression information is generated by using the target neural network, this implementation can improve performance of compression information corresponding to an entire current video sequence as much as possible.

In a possible implementation of the second aspect, for different video frames in a current video sequence, the encoder may use a same manner to select target compression information. Specifically, the encoder calculates, based on the first compression information and the first video frame, a first score (namely, a first score corresponding to the first neural network) corresponding to the first compression information; calculates, based on the second compression information and the second video frame, a second score (namely, a second score corresponding to the second neural network) corresponding to the second compression information; selects a smaller score in the first score and the second score; and determines, from the first compression information and the second compression information, compression information corresponding to the smaller score as the compression information of the current video frame, that is, determines a neural network corresponding to the smaller score as the target neural network.

In this implementation, for each video frame in the current video sequence, the encoder first compresses the current video frame by using the first neural network and the second neural network; obtains the first score corresponding to the first compression information, and the second score corresponding to the second compression information; and determines a smaller score in the first score and the second score, to minimize scores of all video frames in the entire video sequence. This improves performance of the compression information corresponding to the entire current video sequence.

In a possible implementation of the second aspect, the encoder may use one period as a calculation unit; generate, based on two first scores corresponding to first two current video frames in the period, a coefficient and an offset of a first fitting formula corresponding to a plurality of first scores in the period; and generate, based on two second scores corresponding to the first two current video frames in the period, a coefficient and an offset of a second fitting formula corresponding to a plurality of second scores in the period. The encoder determines the compression information of the current video frame from the first compression information and the second compression information according to the first fitting formula and the second fitting formula. An optimization objective is to minimize an average value of total scores in a period, that is, the optimization objective is to minimize the total scores in a period.

In this embodiment of this application, a person skilled in the art discovers a change rule of the first score and the second score in a single period during research, and uses a lowest average value of total scores in one period as an optimization objective. In other words, when target compression information corresponding to each current video frame is determined, both the score of the current video frame and the average value of the scores in the entire period need to be considered, to further reduce scores corresponding to all video frames in the entire current video sequence. This further improves performance of the compression information corresponding to the entire current video sequence.

In the second aspect in this embodiment of this application, the encoder may further perform steps performed by the encoder in the possible implementations of the first aspect. For the second aspect in this embodiment of this application, meanings of terms, specific implementation steps of the second aspect and the possible implementations of the second aspect of this application, and beneficial effect brought by each possible implementation, refer to descriptions in the possible implementations of the first aspect. Details are not described herein again.

According to a third aspect, an embodiment of this application provides a video frame compression method. In the method, an artificial intelligence technology may be applied to the field of video frame encoding/decoding. The method may include: An encoder performs compression encoding on a third video frame by using a first neural network, to obtain first compression information corresponding to the third video frame, where the first compression information includes compression information of a first feature of the third video frame, and a reference frame of the third video frame is used for a compression process of the first feature of the third video frame; and performs compression encoding on a fourth video frame by using a second neural network, to obtain second compression information corresponding to the fourth video frame, where the second compression information includes compression information of a second feature of the fourth video frame, and a reference frame of the fourth video frame is used for a generation process of the second feature of the fourth video frame.

In the third aspect in this embodiment of this application, the encoder may further perform steps performed by the encoder in the possible implementations of the first aspect. For the third aspect in this embodiment of this application, meanings of terms in the third aspect, specific implementation steps in the possible implementations, and beneficial effect brought by each possible implementation, refer to descriptions in the possible implementations of the first aspect. Details are not described herein again.

According to a fourth aspect, an embodiment of this application provides a video frame decompression method. In the method, an artificial intelligence technology may be applied to the field of video frame encoding/decoding. A decoder obtains compression information of a current video frame, and performs decompression, by using a target neural network, based on the compression information of the current video frame, to obtain a reconstructed frame of the current video frame. The target neural network is a neural network selected from a plurality of neural networks, and the plurality of neural networks include a third neural network and a fourth neural network. If the target neural network is the third neural network, the compression information includes first compression information of a first feature of the current video frame. A reference frame of the current video frame is used for a decompression process of the first compression information, to obtain the first feature of the current video frame. The first feature of the current video frame is used for a generation process of the reconstructed frame of the current video frame. If the target neural network is the fourth neural network, the compression information includes second compression information of a second feature of the current video frame, the second compression information is used by the decoder to perform decompression, to obtain the second feature of the current video frame. The reference frame of the current video frame and the second feature of the current video frame are used for the generation process of the reconstructed frame of the current video frame, and a current video sequence includes the reconstructed frame of the current video frame and the reference frame of the current video frame.

In a possible implementation of the fourth aspect, the third neural network includes an entropy decoding layer and a decoding network, the entropy decoding layer is used to perform entropy decoding on the first compression information of the current video frame based on the reference frame of the current video frame, and the decoding network is used to generate the reconstructed frame of the current video frame based on the first feature of the current video frame.

Further, if the compression information is decompressed by using the third neural network, that the decoder performs decompression, by using a target neural network, based on the compression information of the current video frame, to obtain a reconstructed frame of the current video frame may include: The decoder generates probability distribution of the first feature based on a predicted feature of the current video frame. The predicted feature of the current video frame is obtained by predicting the first feature based on the reference frame of the current video frame. The decoder performs entropy decoding on the compression information based on the probability distribution of the first feature, to obtain the first feature; and performs inverse transform decoding on the first feature, to obtain the reconstructed frame of the current video frame.

In a possible implementation of the fourth aspect, the fourth neural network includes an entropy decoding layer and a convolutional network, the entropy decoding layer is used to perform entropy decoding on the second compression information, and the convolutional network is used to perform the generation process of the reconstructed frame of the current video frame based on the reference frame of the current video frame and the second feature of the current video frame.

Further, if the compression information is decompressed by using the fourth neural network, that the decoder performs decompression, by using a target neural network, based on the compression information of the current video frame, to obtain a reconstructed frame of the current video frame may include: The decoder decompresses the second compression information, to obtain the second feature of the fourth video frame, that is, to obtain an optical flow of an original current video frame relative to the reference frame of the current video frame, and a residual between the original current video frame and a predicted current video frame. An encoder predicts the current video frame based on the reference frame of the current video frame and the optical flow of the original current video frame relative to the reference frame of the current video frame, to obtain the predicted current video frame; and generates the reconstructed frame of the current video frame based on the predicted current video frame and the residual between the original current video frame and the predicted current video frame.

In a possible implementation of the fourth aspect, the method may further include: The decoder obtains at least one piece of indication information that one-to-one corresponds to at least one piece of compression information; and determines, based on the at least one piece of indication information and the compression information of the current video frame, the target neural network corresponding to the current video frame from the plurality of neural networks including the third neural network and the fourth neural network.

For the fourth aspect in this embodiment of this application, meanings of terms in the fourth aspect, and beneficial effect brought by each possible implementation, refer to descriptions in the possible implementations of the first aspect. Details are not described herein again.

According to a fifth aspect, an embodiment of this application provides a video frame decompression method. In the method, an artificial intelligence technology may be applied to the field of video frame encoding/decoding. A decoder decompresses first compression information of a third video frame by using a third neural network, to obtain a reconstructed frame of the third video frame. The first compression information includes compression information of a first feature of the third video frame, a reference frame of the third video frame is used for a decompression process of the first compression information, to obtain the first feature of the third video frame, and the first feature of the third video frame is used for a generation process of the reconstructed frame of the third video frame. The decoder decompresses second compression information of a fourth video frame by using a fourth neural network, to obtain a decompressed fourth video frame. The second compression information includes compression information of a second feature of the fourth video frame, the second compression information is used by the decoder to perform decompression, to obtain the second feature of the fourth video frame, and a reference frame of the fourth video frame and the second feature of the fourth video frame are used for a generation process of a reconstructed frame of the fourth video frame.

In the fifth aspect in this embodiment of this application, the decoder may further perform steps performed by the decoder in the possible implementations of the fourth aspect. For the fifth aspect in this embodiment of this application, meanings of terms in the fifth aspect, specific implementation steps in the possible implementations, and beneficial effect brought by each possible implementation, refer to descriptions in the possible implementations of the fourth aspect. Details are not described herein again.

According to a sixth aspect, an embodiment of this application provides an encoder, including a processing circuit configured to perform the method in any one of the first aspect, the second aspect, the third aspect, the fourth aspect, or the fifth aspect.

According to a seventh aspect, an embodiment of this application provides a decoder, including a processing circuit configured to perform the method in any one of the first aspect, the second aspect, the third aspect, the fourth aspect, or the fifth aspect.

According to an eighth aspect, an embodiment of this application provides a computer program product. When the computer program product is run on a computer, the computer is enabled to perform the method in any one of the first aspect, the second aspect, the third aspect, the fourth aspect, or the fifth aspect.

According to a ninth aspect, an embodiment of this application provides an encoder, including one or more processors, a non-transitory computer-readable storage medium that is coupled to the processor and stores program instructions executed by the processor. When the program instructions are executed by the processor, the encoder is enabled to perform the video frame compression method in any one of the first aspect, the second aspect, or the third aspect.

According to a tenth aspect, an embodiment of this application provides a decoder, including one or more non-transitory computer-readable storage media that are coupled to a processor and store program instructions executed by the processor. When the program instructions are executed by the processor, the decoder is enabled to perform the video frame decompression method in any one of the fourth aspect or the fifth aspect.

According to an eleventh aspect, an embodiment of this application provides a non-transitory computer-readable storage medium. The non-transitory computer-readable storage medium includes program code, and when the program code is run on a computer, the computer is enabled to perform the method in any one of the first aspect, the second aspect, the third aspect, the fourth aspect, or the fifth aspect.

According to a twelfth aspect, an embodiment of this application provides a circuit system. The circuit system includes a processing circuit, and the processing circuit is configured to perform the method in any one of the first aspect, the second aspect, the third aspect, the fourth aspect, or the fifth aspect.

According to a thirteenth aspect, an embodiment of this application provides a chip system. The chip system includes a processor configured to implement functions in the foregoing aspects, for example, sending or processing data and/or information in the foregoing method. In a possible design, the chip system further includes a memory. The memory is configured to store program instructions and data that are necessary for a server or a communication device. The chip system may include a chip, or may include a chip and another discrete component.

DESCRIPTION OF DRAWINGS

FIG. 3 is a schematic flowchart of a video frame compression method according to an embodiment of this application;

FIG. 4 is a schematic diagram of a correspondence between a location of a current video frame and a used target neural network in a video frame compression method according to an embodiment of this application;

FIG. 5C is a schematic diagram of comparison between a first feature and a second feature in a video frame compression method according to an embodiment of this application;

FIG. 7A is another schematic flowchart of a video frame compression method according to an embodiment of this application;

FIG. 8 is another schematic flowchart of a video frame compression method according to an embodiment of this application;

FIG. 9 is a schematic diagram of a video frame compression method according to an embodiment of this application;

FIG. 10A is a schematic flowchart of a video frame decompression method according to an embodiment of this application;

FIG. 10B is another schematic flowchart of a video frame decompression method according to an embodiment of this application;

FIG. 11 is another schematic flowchart of a video frame decompression method according to an embodiment of this application;

FIG. 12 is a schematic flowchart of a method for training a video frame compression and decompression system according to an embodiment of this application;

DESCRIPTION OF EMBODIMENTS

In the specification, claims, and the accompanying drawings of this application, terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, terms "include", "contain" and any other variants mean to cover the non-exclusive inclusion, so that a process, method, system, product, or device that includes a series of units is not limited to those units, but may include other units not expressly listed or inherent to such a process, method, system, product, or device.

The following describes embodiments of this application with reference to the accompanying drawings. A person of ordinary skill in the art may learn that as a technology evolves and a new scenario emerges, technical solutions provided in embodiments of this application are also applicable to a similar technical problem.

Figure 1A:
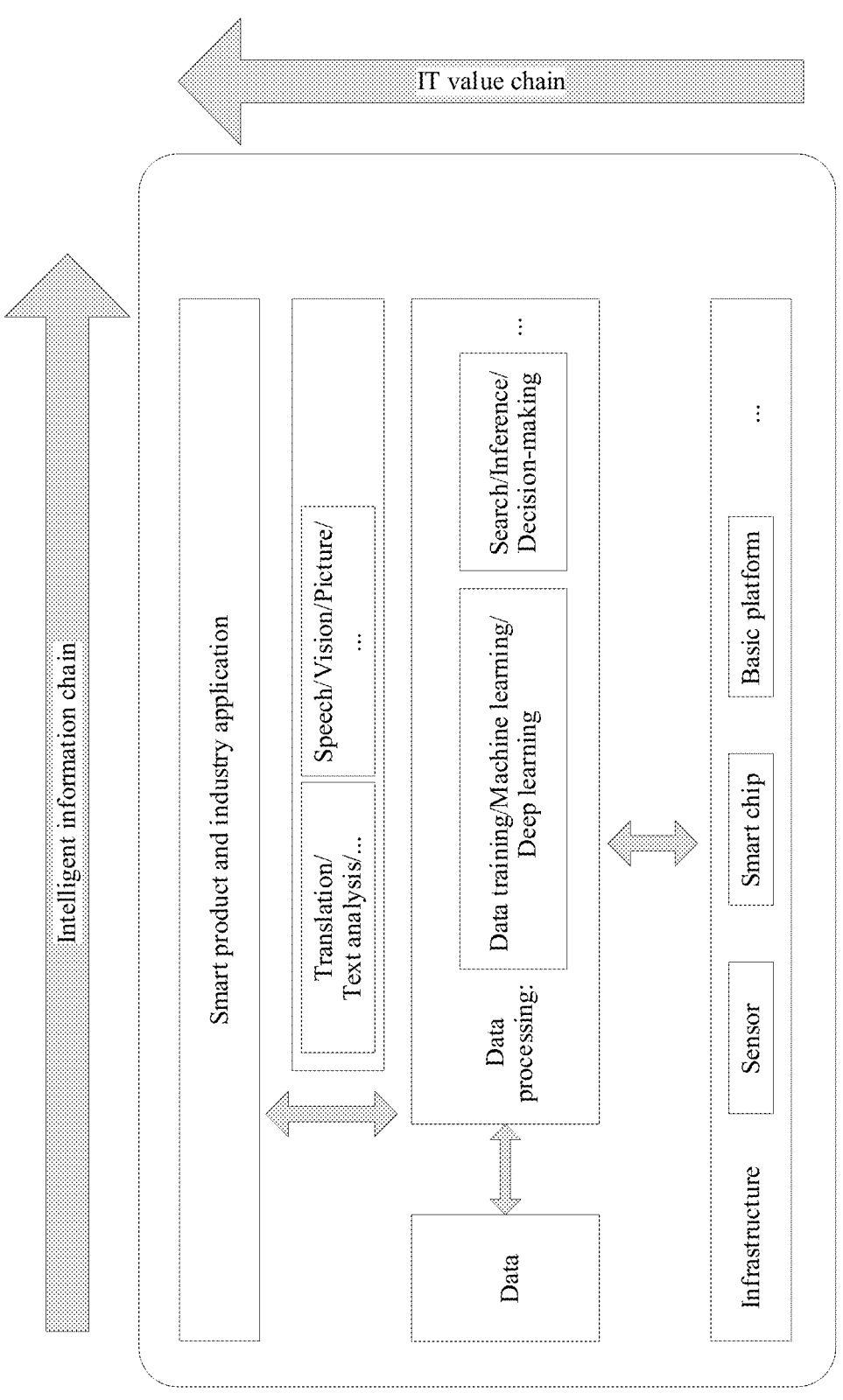
FIG. 1A is a schematic diagram of a structure of an artificial intelligence main framework according to an embodiment of this application.

An overall working procedure of an artificial intelligence system is first described. FIG. 1A is a schematic diagram of a structure of an artificial intelligence main framework. The following describes the artificial intelligence main framework from two dimensions: an "intelligent information chain" (horizontal axis) and an "IT value chain" (vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In these processes, the data undergoes a refinement process of "data-information-knowledge-intelligence". The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides computing capability support for the artificial intelligence system, implements communication with the external world, and implements support by using a basic platform. The infrastructure communicates with the outside by using a sensor. A computing capability is provided by a smart chip. For example, the smart chip includes a hardware acceleration chip such as a central processing unit (CPU), a neural network processing unit (NPU), a graphics processing unit (GPU), an application-specific integrated circuit (ASIC), or a field-programmable gate array (FPGA). The basic platform includes related platforms, for example, a distributed computing framework and a network, for assurance and support, including cloud storage and computing, an interconnection network, and the like. For example, the sensor communicates with the outside to obtain data, and the data is provided to the smart chip in a distributed computing system provided by the basic platform for computing.

(2) Data

Data at an upper layer of the infrastructure indicates a data source in the field of artificial intelligence. The data relates to a graph, a picture, speech, and text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system, such as translation, text analysis, computer vision processing, speech recognition, and picture recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include a smart terminal, smart manufacturing, smart transportation, smart home, smart health care, smart security protection, autonomous driving, a smart city, and the like.

Figure 1B:
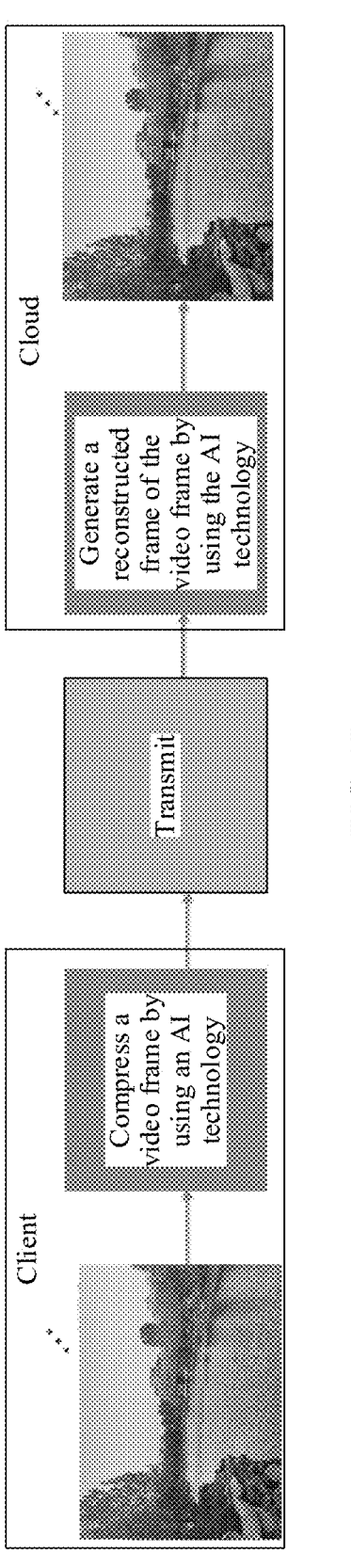
FIG. 1B is a diagram of an application scenario of a video frame compression method and a video frame decompression method according to an embodiment of this application.

Embodiments of this application may be mainly applied to a scenario in which encoding/decoding needs to be performed on a video frame of a video in the foregoing various application fields. Specifically, to more intuitively understand the application scenario of the solution, FIG. 1B is a diagram of an application scenario of a video frame compression method and a video frame decompression method according to an embodiment of this application. Refer to FIG. 1B. For example, an album of a client may store a video, and a requirement for sending the video in the album to a cloud server is stored. Then, the client (namely, an encoder) may perform compression encoding on a video frame by using an AI technology, to obtain compression information corresponding to each video frame. The compression information corresponding to each video frame is transmitted to the cloud server. Correspondingly, the cloud server (namely, a decoder) may perform decompression by using the AI technology, to obtain a reconstructed frame of the video frame. It should be understood that the example in FIG. 1B is merely for ease of understanding the solution, and is not intended to limit the solution.

In another example, in the smart city field, a monitor needs to send a collected video to a management center. Before sending the video to the management center, the monitor (namely, an encoder) needs to compress a video frame of the video. Correspondingly, the management center (namely, a decoder) needs to decompress the video frame of the video, to obtain the video frame.

Figure 1C:
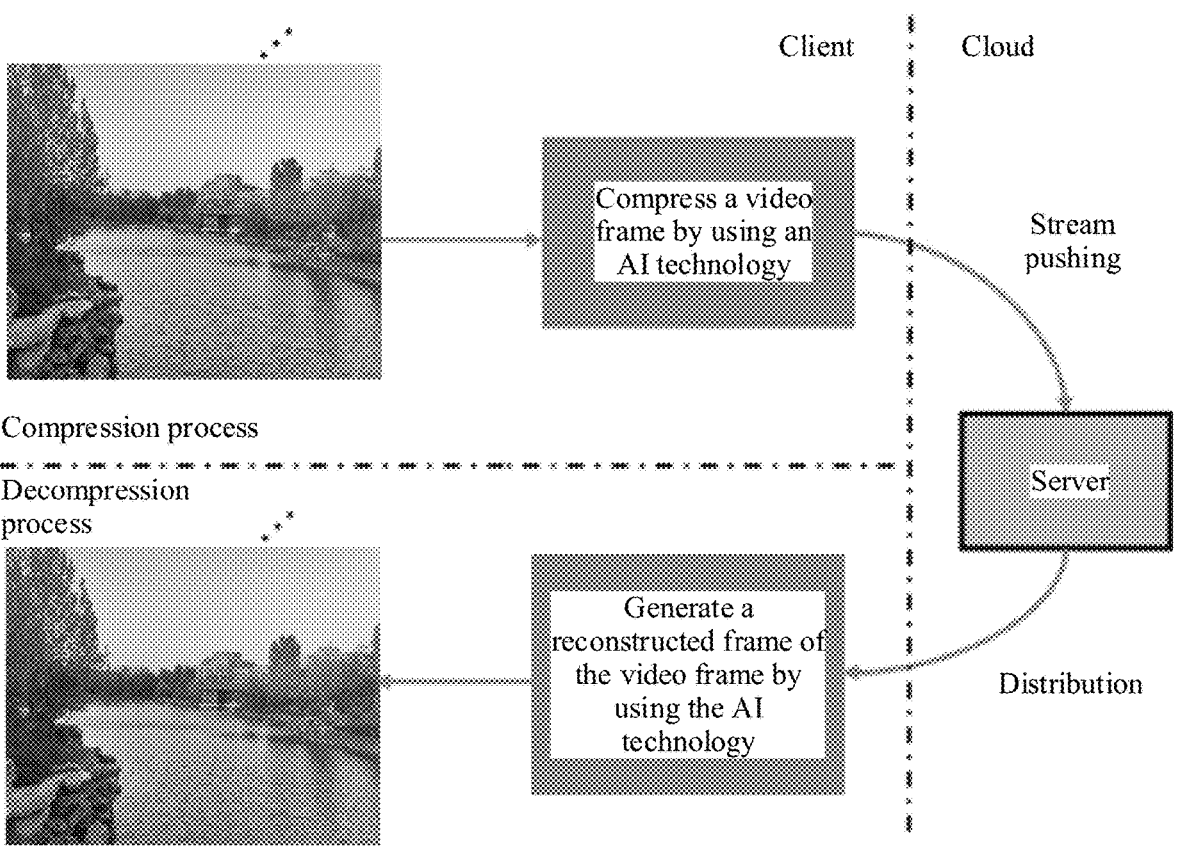
FIG. 1C is a diagram of another application scenario of a video frame compression method and a video frame decompression method according to an embodiment of this application.

For another example, to more intuitively understand the application scenario of the solution, FIG. 1C is a diagram of another application scenario of a video frame compression method and a video frame decompression method according to an embodiment of this application. FIG. 1C is described by using an example in which an embodiment of this application is applied to a live broadcast scenario. An anchor collects a video by using a client, the client needs to send the collected video to a server, and the server distributes the video to a user. Before the client (namely, an encoder) sends the video to the server, compression encoding needs to be performed on a video frame of the video by using the AI technology. Correspondingly, a client (namely, a decoder) used by the user needs to perform decompression by using the AI technology, to obtain a reconstructed frame of the video frame, and the like. It should be understood that the example in FIG. 1C is merely for ease of understanding the solution, and is not intended to limit the solution.

It should be noted that the example is merely for ease of understanding the application scenario of embodiments of this application, and application scenarios of embodiments of this application is not enumerated.

In this embodiment of this application, compression encoding and decompression are performed on a video frame by using the AI technology (namely, a neural network). Therefore, this embodiment of this application includes an inference phase of the neural network and a training phase of the neural network. Processes of the inference phase and the training phase of the neural network are different. The following separately describes the inference phase and the training phase.

1. Inference Phase

It can be learned from the foregoing descriptions that in the compression encoding method and the decompression method provided in embodiments of this application, the encoder performs compression encoding, and the decoder performs decompression. The following separately describes operations of the encoder and the decoder. Further, when a plurality of neural networks are configured for the encoder, the following describes a process in which the encoder generates target compression information corresponding to a current video. In an implementation, the encoder may first determine a target neural network from the plurality of neural networks according to a network selection policy, and generate, by using the target neural network, the target compression information corresponding to the current video frame. In another implementation, the encoder may separately generate a plurality of pieces of compression information of the current video frame by using the plurality of neural networks, and determine, based on the generated plurality of pieces of compression information, the target compression information corresponding to the current video frame. Because implementation procedures of the foregoing two implementations are different, the following separately describes the two implementations.

1. The encoder first selects the target neural network from the plurality of neural networks.

Figure 2:
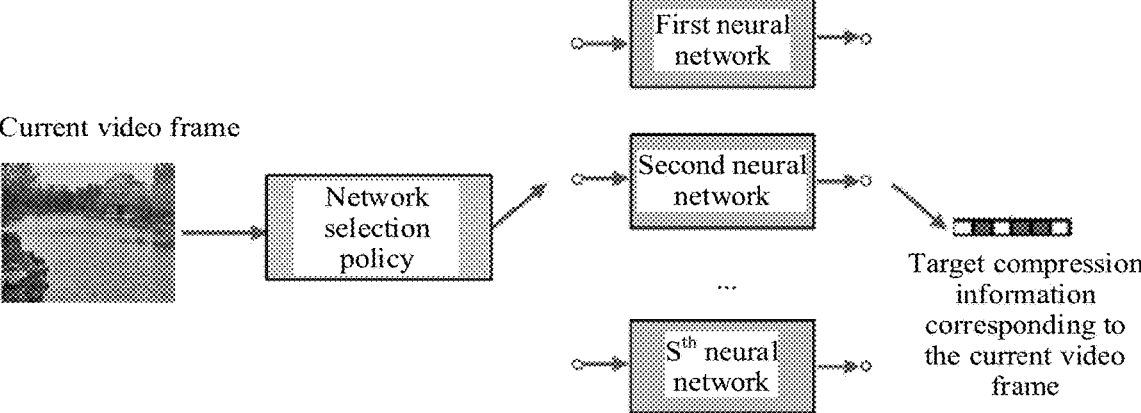
FIG. 2 is a schematic diagram of a principle of a video frame compression method according to an embodiment of this application.

In some embodiments of this application, the encoder first selects, from the plurality of neural networks according to the network selection policy, the target neural network used to process the current video frame. To more intuitively understand the solution, FIG. 2 is a schematic diagram of a principle of a video frame compression method according to an embodiment of this application. As shown in FIG. 2, for any video frame (namely, the current video frame in FIG. 2) in a current video sequence, the encoder selects a target neural network from the plurality of neural networks according to the network selection policy, and performs compression encoding on the current video frame by using the target neural network, to obtain the target compression information corresponding to the current video frame. It should be understood that the example in FIG. 2 is merely for ease of understanding the solution, and is not intended to limit the solution. Specifically, FIG. 3 is a schematic flowchart of a video frame compression method according to an embodiment of this application. The video frame compression method according to an embodiment of this application may include the following steps.

301: An encoder determines a target neural network from a plurality of neural networks according to a network selection policy.

In this embodiment of this application, a plurality of neural networks are configured for the encoder. The plurality of neural networks at least include a first neural network, a second neural network, or another neural network used to perform compression. The first neural network, the second neural network, and another type of neural network are all trained neural networks. When processing a current video frame in a current video sequence, the encoder may determine the target neural network from the plurality of neural networks according to the network selection policy, and perform compression encoding on the current video frame by using the target neural network, to obtain target compression information corresponding to the current video frame. The target compression information is compression information that the encoder finally determines to send to a decoder. In other words, the target compression information is generated by one target neural network in the plurality of neural networks.

It should be noted that subsequent embodiments of this application are described by using an example in which the plurality of neural networks include only the first neural network and the second neural network. For a case in which the plurality of neural networks include three or more neural networks, refer to the descriptions of the case in which the plurality of neural networks include the first neural network and the second neural network in this embodiment of this application. Details are not described again in embodiments of this application.

Video encoding usually means processing a picture sequence that forms a video or a video sequence. In the field of video encoding, the terms "picture", "video frame (frame)", or "image" may be used as synonyms. Video encoding is performed at a source side, and usually includes processing (for example, compressing) an original video frame, to reduce a data amount required to represent the video frame (therefore improving efficiency of storage and/or transmission). Video decoding is performed at a destination side, and usually includes inverse processing relative to the encoder, to reconstruct the video frame. The encoding part and the decoding part are also referred to as encoding/decoding (CODEC).

The network selection policy is related to any one or more of the following factors: location information of the current video frame or a data amount carried in the current video frame.

Specifically, the following describes a process in which the target neural network is selected from the plurality of neural networks according to the network selection policy. In an implementation, step 301 may include: The encoder may obtain the location information of the current video frame in the current video sequence, where the location information indicates that the current video frame is an Xth frame in the current video sequence; and selects, according to the network selection policy, the target neural network corresponding to the location information of the current video sequence from the plurality of neural networks including the first neural network and the second neural network.

The location information of the current video frame in the current video sequence may specifically be represented as an index number, and the index number may specifically be represented as a character string. For example, the index number of the current video frame may specifically be 00000223, 00000368, or another character string, and is not enumerated herein.

The network selection policy may be alternately selecting the first neural network or the second neural network according to a specific rule. In other words, the encoder performs compression encoding on n video frames of the current video frame by using the first neural network, and then performs compression encoding on m video frames of the current video frame by using the second neural network. Alternatively, after performing compression encoding on m video frames of the current video frame by using the second neural network, the encoder performs compression encoding on n video frames of the current video frame by using the first neural network. Values of both n and m may be integers greater than or equal to 1, and the values of n and m may be the same or different.

For example, if the values of n and m are 1, the network selection policy may be performing compression encoding on an odd frame in the current video sequence by using the first neural network, and performing compression encoding on an even frame in the current video sequence by using the second neural network. Alternatively, the network selection policy may be performing compression encoding on an odd frame in the current video sequence by using the second neural network, and performing compression encoding on an even frame in the current video sequence by using the first neural network. In another example, for example, the value of n is 1, and the value of m is 3. The network selection policy may be after compression encoding is performed on one video frame in the current video sequence by using the first neural network, the second neural network is used to perform compression encoding on three consecutive video frames in the current video sequence, and the like. This is not enumerated herein.

To more intuitively understand the solution, FIG. 4 is a schematic diagram of a correspondence between a location of the current video frame and the used target neural network in the video frame compression method according to an embodiment of this application. FIG. 3 is described by using an example in which the value of n is 1 and the value of m is 3. As shown in FIG. 4, after performing compression encoding on a tth video frame by using the first neural network, the encoder performs compression encoding separately on a (t+1)th video frame, a (t+2)th video frame, and a (t+3)th video frame by using the second neural network; and performs compression encoding on a (t+4)th video frame by using the first neural network for another time. In other words, after compression encoding is performed on one current video frame by using the first neural network, compression encoding is performed on three current video frames by using the second neural network. It should be understood that the example in FIG. 4 is merely for ease of understanding the solution, and is not intended to limit the solution.

In another implementation, step 301 may include: The encoder may obtain an attribute of the current video frame, and select the target neural network from the first neural network and the second neural network. The attribute of the current video frame indicates the data amount carried in the current video frame, and the attribute of the current video frame includes any one or any combination of the following: an entropy, contrast, saturation, and another type of attribute of the current video frame. This is not enumerated herein.

Further, a larger entropy of the current video frame indicates a larger data amount carried in the current video frame, and a larger probability that the target neural network is the second neural network. A smaller entropy of the current video frame indicates a smaller probability that the target neural network is the second neural network. Larger contrast of the current video frame indicates a larger data amount carried in the current video frame, and a larger probability that the target neural network is the second neural network. Smaller contrast of the current video frame indicates a smaller probability that the target neural network is the second neural network.

In this embodiment of this application, the target neural network is selected from the plurality of neural networks based on the location information of the current video frame in the current video sequence. Alternatively, the target neural network may be selected from the plurality of neural networks based on at least one attribute of the current video, to generate the compression information of the current video frame by using the target neural network. This provides a plurality of implementation solutions that are simple and easy to operate, and improves implementation flexibility of the solution.

In another implementation, the encoder may select either the first neural network or the second neural network as the target neural network, to generate the target compression information of the current video frame by using the target neural network. Optionally, the encoder may separately configure a first selection probability of the first neural network and a second selection probability of the second neural network, where a value of the second selection probability is greater than or equal to a value of the first selection probability; and then select the target neural network based on the first selection probability and the second selection probability. For example, the value of the first selection probability is 0.2, and the value of the second selection probability is 0.8. In another example, the value of the first selection probability is 0.3, and the value of the second selection probability is 0.7. Values of the first selection probability and the second selection probability are not enumerated herein.

302: The encoder performs compression encoding on the current video frame by using the target neural network, to obtain the target compression information corresponding to the current video frame.

In this embodiment of this application, the target neural network may be the first neural network, the second neural network, another network used to compress a video frame, or the like. If the compression information is obtained by using the first neural network, the target compression information includes first compression information of a first feature of the current video frame, a reference frame of the current video frame is used for a compression process of the first feature of the current video frame, and the reference frame of the current video frame is not used for a generation process of the first feature of the current video frame.

Both the reference frame of the current video frame and the current video frame are from the current video sequence. The current video frame is an original video frame included in the current video sequence. In an implementation, the reference frame of the current video frame may be an original video frame in the current video sequence, and a sorting location of the reference frame in the current video sequence may be located before or after the current video frame. In other words, when the current video sequence is played, the reference frame may appear earlier than the current video frame, or may appear later than the current video frame.

In another implementation, the reference frame of the current video frame may not be an original video frame in the current video sequence, and a sorting location of an original reference frame, in the current video sequence, corresponding to the reference frame of the current video frame may be located before or after the current video frame. The reference frame of the current video frame may be a video frame obtained after the encoder performs transform encoding and inverse transform decoding on the original reference frame. Alternatively, the reference frame of the current video frame is a video frame obtained after the encoder performs compression encoding and decompression on the original reference frame. Still further, compression may be implemented by using the first neural network or the second neural network.

Refer to descriptions in Patent Application No. CN202011271217.8. The first neural network may at least include an encoding network and an entropy encoding layer, the encoding network is used to obtain the first feature of the current video frame from the current video frame, and the entropy encoding layer is used to perform the compression process of the first feature of the current video frame based on the reference frame of the current video frame, to output the first compression information corresponding to the current video frame.

Figure 5A:
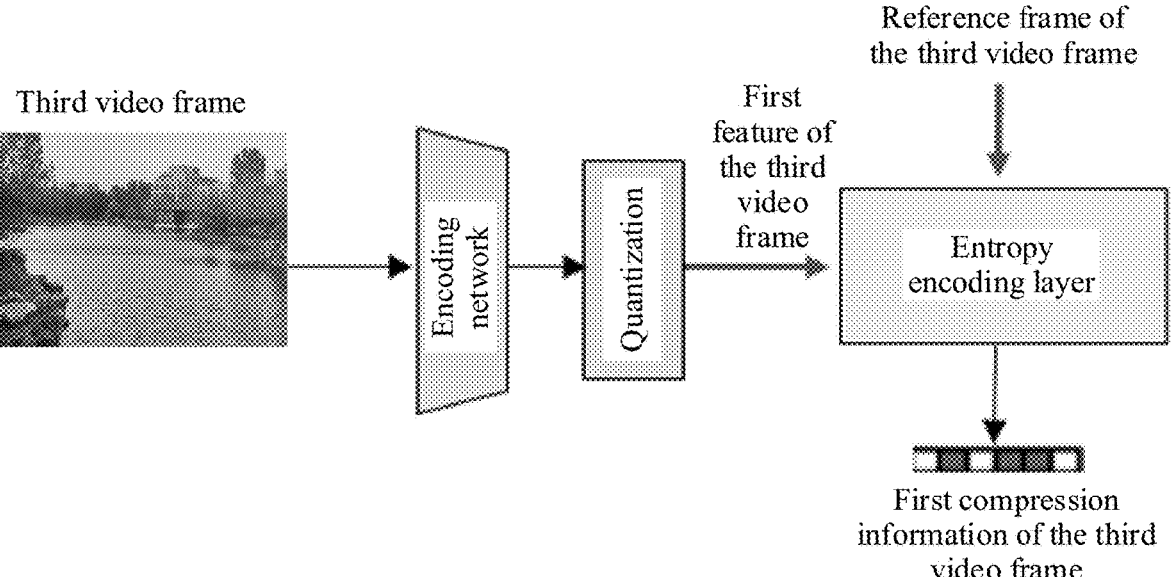
FIG. 5A is a schematic diagram of a structure of a first neural network according to an embodiment of this application.

To more intuitively understand the solution, FIG. 5A is a schematic diagram of a structure of the first neural network according to an embodiment of this application. As shown in FIG. 5A, the encoding network is used to encode and perform quantization on the current video frame, to obtain the first feature of the current video frame. The entropy encoding layer is used to compress the first feature of the current video frame based on the reference frame of the current video frame, to output the first compression information (namely, an example of the target compression information corresponding to the current video frame) corresponding to the current video frame. It should be understood that the example in FIG. 5A is merely for ease of understanding the solution, and is not intended to limit the solution.

Specifically, the following describes a process in which the encoder generates, by using the first neural network, the first compression information corresponding to the current video frame. The encoder may perform transform encoding on the current video frame by using a first encoding network (encoding network), and perform quantization after transform encoding is performed, to obtain the first feature of the current video frame. In other words, the first feature of the current video frame can be obtained only based on the current video frame, and the reference frame of the current video frame is not needed in the generation process of the first feature.

Further, the first encoding network may specifically be represented as a multi-layer convolutional network. The first feature includes features of M pixels, and may specifically be represented as an L-dimensional tensor, for example, a one-dimensional tensor (namely, a vector), a two-dimensional tensor (namely, a matrix), a three-dimensional tensor, or a higher-dimensional tensor. This is not enumerated herein.

The encoder predicts a feature of the current video frame based on N reference frames of the current video frame, to generate a first predicted feature of the current video frame; and generates probability distribution of the first feature of the current video frame based on the first predicted feature of the current video frame. The encoder performs entropy encoding on the first feature of the current video frame based on the probability distribution of the first feature of the current video frame, to obtain the first compression information.

The first predicted feature of the current video frame is a predicted result of the first feature of the current video frame, the first predicted feature of the current video frame also includes features of M pixels, and the first predicted feature of the current video frame may specifically be represented as a tensor. A data shape of the first predicted feature of the current video frame is the same as a data shape of the first feature of the current video frame, and that the shape of the first predicted feature is the same as the shape of the first feature means that both the first predicted feature and the first feature are L-dimensional tensors, and a size of a first dimension in L dimensions of the first predicted feature is the same as a size of a second dimension in L dimensions of the first feature. L is an integer greater than or equal to 1, the first dimension is any dimension in the L dimensions of the first predicted feature, and the second dimension is a dimension, in the L dimensions of the first feature, that is the same as the first dimension.

The probability distribution of the first feature of the current video frame includes a mean of the first feature of the current video frame and a variance of the first feature of the current video frame. Further, both the mean of the first feature and the manner of the first feature may be represented as an L-dimensional tensor, a data shape of the mean of the first feature is the same as the data shape of the first feature, and a shape of the variance of the first feature is the same as the data shape of the first feature. Therefore, the mean of the first feature includes a value corresponding to each of the M pixels, and the variance of the first feature includes a value corresponding to each of the M pixels.

For a specific implementation in which the encoder predicts the feature of the current video frame based on the N reference frames of the current video frame, to generate the first predicted feature of the current video frame, and a specific implementation in which the encoder generates the probability distribution of the first feature of the current video frame based on the first predicted feature of the current video frame, refer to descriptions in Patent Application No. CN202011271217.8.

A difference lie in that in Patent Application No. CN202011271217.8, a feature of a first video frame is predicted based on N second video frames, to generate a first predicted feature of the first video frame, and probability distribution of the first feature of the first video frame is generated based on the first predicted feature of the first video frame. In this embodiment of this application, the current video frame is predicted based on the N reference frames of the current video frame, to generate the first predicted feature of the current video frame, and the probability distribution of the first feature of the current video frame is generated based on the first predicted feature of the current video frame. In other words, the "first video frame" in Patent Application No. CN202011271217.8 is replaced with the "current video frame" in this embodiment of this application, and the "second video frame" in Patent Application No. CN202011271217.8 is replaced with the "reference frame of the current video frame" in this embodiment of this application. For a specific implementation, refer to descriptions in Patent Application No. CN202011271217.8. Details are not described herein.

In this embodiment of this application, the encoder generates the probability distribution of the first feature of the current video frame based on the first predicted feature corresponding to the current video frame, and then performs compression encoding on the first feature of the current video frame based on the probability distribution of the first feature of the current video frame, to obtain the first compression information of the current video frame. A higher similarity between the first predicted feature and the first feature indicates a larger compression rate of the first feature and smaller first compression information that is finally obtained. The first predicted feature of the current video frame is obtained by predicting the feature of the current video frame based on the N reference frames of the current video frame, to improve the similarity between the first predicted feature of the current video frame and the first feature of the current video frame. This reduces a size of compressed first compression information. In other words, this can ensure quality of a reconstructed frame obtained by the decoder, and reduce a data amount transmitted between the encoder and the decoder.

If the target compression information is obtained by using the second neural network, the target compression information includes second compression information of a second feature of the current video frame, and the reference frame of the current video frame is used for a generation process of the second feature of the current video frame. The second neural network includes a convolutional network and an entropy encoding layer, the convolutional network includes a plurality of convolutional layers and an activation ReLU layer, the convolutional network is used to perform the generation process of the second feature of the current video frame based on the reference frame of the current video frame, and the entropy encoding layer is used to compress the second feature of the current video frame, to output the second compression information corresponding to the current video frame.

In this embodiment of this application, specific network structures of the first neural network and the second neural network are provided. This improves integration between the solution and a specific application scenario.

Specifically, after generating an optical flow of the original current video frame relative to the reference frame of the current video frame, the encoder may perform compression encoding on the optical flow, to obtain a compressed optical flow. The second feature of the current video frame may include only the optical flow of the original current video frame relative to the reference frame of the current video frame.

Optionally, the encoder may alternatively generate a predicted current video frame based on the reference frame of the current video frame and the optical flow of the original current video frame relative to the reference frame of the current video frame; calculate a residual between the original current video frame and the predicted current video frame; and perform compression encoding on the optical flow of the original current video frame relative to the reference frame of the current video frame and the residual between the original current video frame and the predicted current video frame, to output the second compression information corresponding to the current video frame. The second feature of the current video frame includes the optical flow of the original current video frame relative to the reference frame of the current video frame and the residual between the original current video frame and the predicted current video frame.

Further, after the encoder obtains the second feature of the current video frame, because the data amount of the second feature of the current video frame is small, the encoder may directly compress the second feature of the current video frame, to obtain the second compression information corresponding to the current video frame. Compression may be implemented by using the neural network or implemented in a non-neural network manner. For example, compression encoding may be entropy encoding.

Figure 5B:
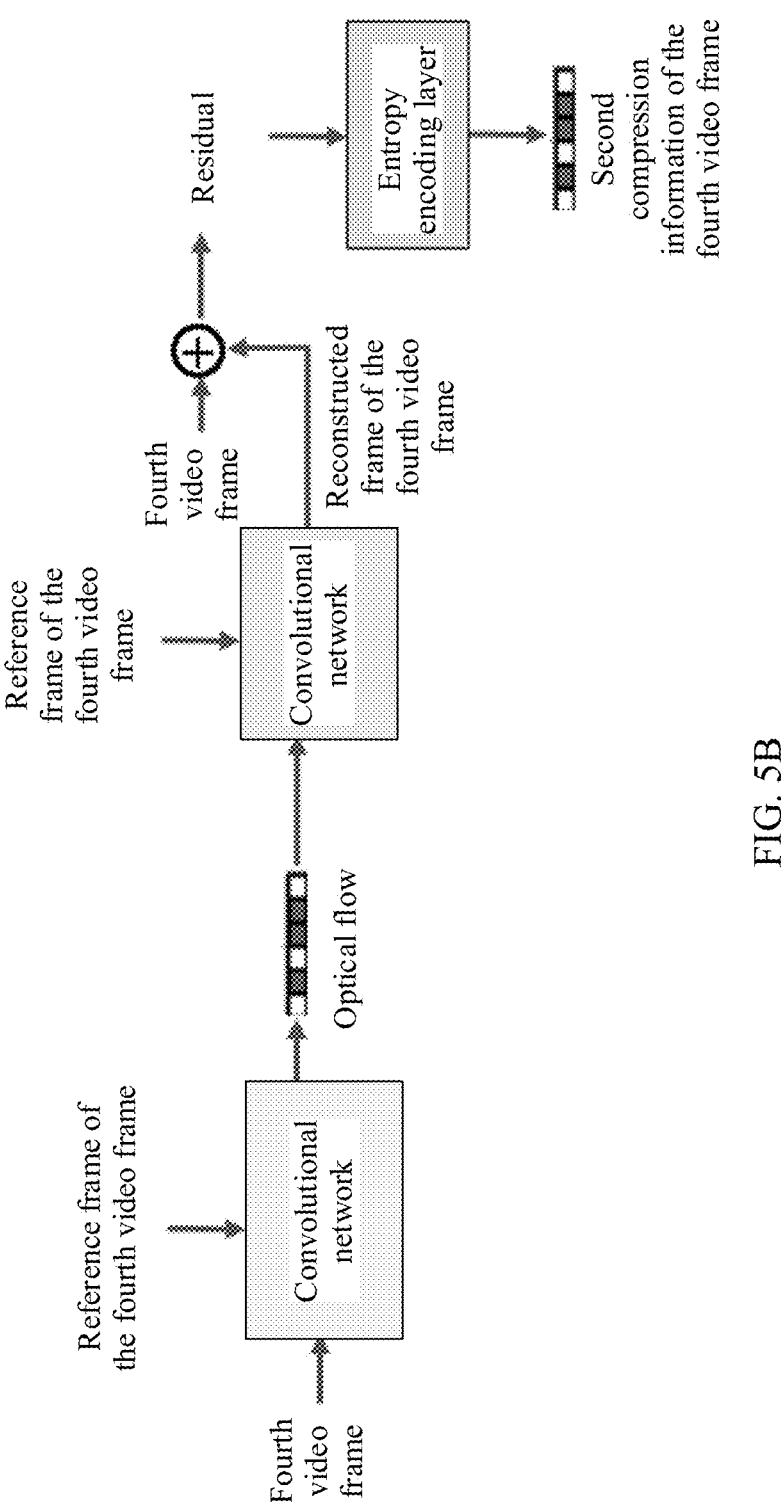
FIG. 5B is a schematic diagram of a structure of a second neural network according to an embodiment of this application.

To more intuitively understand the solution, FIG. 5B is a schematic diagram of a structure of the second neural network according to an embodiment of this application. As shown in FIG. 5B, the encoder inputs the current video frame and the reference frame of the current video frame to the convolutional network, and performs optical flow estimation by using the convolutional network, to obtain the optical flow of the current video frame relative to the reference frame of the current video frame. The encoder generates, by using the convolutional network, the reconstructed frame of the current video frame based on the reference frame of the current video frame and the optical flow of the current video frame relative to the reference frame of the current video frame; and obtains a residual between the reconstructed frame of the current video and the current video frame. The encoder may compress the optical flow of the current video frame relative to the reference frame of the current video frame and the residual between the reconstructed frame of the current video and the current video frame by using the entropy encoding layer, to output the second compression information of the current video frame. It should be understood that the example in FIG. 5B is merely for ease of understanding the solution, and is not intended to limit the solution.

To more intuitively understand a difference between the first feature and the second feature, FIG. 5C is a schematic diagram of comparison between the first feature and the second feature in the video frame compression method according to an embodiment of this application. FIG. 5C includes two subgraphs: (a) and (b). (a) in FIG. 5C is a schematic diagram of generating the first feature of the current video frame, and (b) in FIG. 5C is a schematic diagram of generating the second feature of the current video frame. Refer to (a) in FIG. 5A. The current video frame is input to the encoding network, and the encoding network is used to perform transform encoding and quantization (quantization, Q), to obtain the first feature of the current video frame, where quantization is performed after transform encoding.

Refer to (b) in FIG. 5C. Content in the dashed-line box in (b) in FIG. 5C indicates the second feature of the current video frame. (b) in FIG. 5C shows in detail that the second feature of the current video frame includes both the optical flow of the original current video frame relative to the reference frame of the current video frame and the residual between the original current video frame and the predicted current video frame. The generation process of the second feature of the current video frame is not described herein. It can be learned from comparison between (a) in FIG. 5C and (b) in FIG. 5C that the reference frame of the current video frame is not needed in the generation process of the first feature of the current video frame, but is needed in the generation process of the second feature of the current video frame. It should be understood that the example in FIG. 5C is merely for ease of understanding concepts of the first feature and the second feature, and is not intended to limit the solution.

It should be noted that another neural network (which is referred to as a "fifth neural network" for ease of description) used to perform compression encoding on the video frame may also be configured in the encoder, but the encoder is at least configured with the first neural network and the second neural network. For a detailed process of performing compression encoding by using the first neural network and the second neural network, refer to descriptions in subsequent embodiments. Details are not described herein. For example, the fifth neural network may be a neural network that directly compresses the current video frame. In other words, the encoder may input the current video frame to the fifth neural network, and directly compress the current video frame by using the fifth neural network, to obtain third compression information that corresponds to the current video frame and that is output by the fifth neural network. Further, the fifth neural network may specifically be a convolutional neural network.

303: The encoder generates indication information corresponding to the target compression information, where the indication information indicates that the target compression information is obtained by using the target neural network which is either the first neural network or the second neural network.

In this embodiment of this application, after obtaining target compression information of one or more current video frames, the encoder may further generate at least one piece of indication information that one-to-one corresponds to target compression information of at least one current video frame. The at least one piece of indication information indicates that each piece of target compression information is obtained by using the target neural network which is either the first neural network or the second neural network. In other words, the piece of indication information indicates that either the first neural network or the second neural network is used to obtain the piece of target compression information.

The plurality of pieces of indication information corresponding to the target compression information of the plurality of video frames in the current video sequence may specifically be represented as a character string or in another form. For example, the plurality of pieces of indication information corresponding to the target compression information of the plurality of video frames in the current video sequence may specifically be 0010110101. One character in the character string indicates one piece of indication information. When one piece of indication information is 0, it indicates that a current video frame corresponding to the indication information is compressed by using the first neural network. When one piece of indication information is 1, it indicates that a current video frame corresponding to the indication information is compressed by using the second neural network.

Specifically, in an implementation, each time the encoder obtains target compression information of one current video frame, the encoder may generate one piece of indication information corresponding to the target compression information of the current video frame. In other words, the encoder may alternately perform step 303 and step 301 and step 302.

In another implementation, the encoder may alternatively generate, by using step 301, target compression information of a preset quantity of current video frames, and then generate a preset quantity of pieces of indication information corresponding to the preset quantity of current video frames, where the preset quantity is an integer greater than 1, for example, 3, 4, 5, 6, or another value. This is not limited herein.

In another implementation, the encoder may alternatively generate, by using step 301 and step 302, a plurality of pieces of target compression information corresponding to the entire current video sequence, and then generate, by using step 303, a plurality of pieces of indication information corresponding to the entire current video sequence. A specific implementation is not limited herein.

304: The encoder sends the target compression information of the current video frame.

In this embodiment of this application, the encoder may send the target compression information of the at least one current video frame in the current video sequence to the decoder under constraint of the File Transfer Protocol (FTP).

Specifically, in some implementations, the encoder may directly send at least one piece of target compression information to the decoder. In another implementation, the encoder may alternatively send at least one piece of target compression information to an intermediate device such as a server or a management center, and the intermediate device sends the target compression information to the decoder.

Optionally, if the target compression information is generated by using the first neural network, refer to descriptions in Patent Application No. CN202011271217.8. When sending the first compression information of the current video frame to the decoder, the encoder may further send, to the decoder in a manner of generating the first predicted feature of the current video frame, one or two types of first inter-side information, second inter-side information, first intra-side information, and second intra-side information corresponding to the current video frame. Correspondingly, the decoder may receive one or two types of the first inter-side information, the second inter-side information, the first intra-side information, and the second intra-side information corresponding to the current video frame. A specific type of information that is sent needs to be determined based on a type of information required during decompression of the first compression information of the current video frame.

Further, for meanings and functions of the first inter-side information, the second inter-side information, the first intra-side information, and the second intra-side information, refer to descriptions in Patent Application No. CN202011271217.8. Details are not described herein.

305: The encoder sends the indication information corresponding to the target compression information of the current video frame.

In this embodiment of this application, step 305 is an optional step. If step 303 is not performed, step 305 is not performed. If step 303 is performed, step 305 is performed. If step 305 is performed, step 305 and step 304 may be performed simultaneously. In other words, the encoder sends, to the decoder under constraint of the FTP protocol, the target compression information of the at least one current video frame in the current video sequence, and the at least one piece of indication information that one-to-one corresponds to the target compression information of the at least one current video frame. Alternatively, step 304 and step 305 may be performed separately. An execution sequence of step 304 and step 305 is not limited in this embodiment of this application.

Correspondingly, the decoder can obtain the plurality of pieces of indication information corresponding to the plurality of pieces of target compression information, so that the decoder can learn of that either the first neural network or the second neural network is used to decompress each video frame in the current video sequence. This helps reduce time for the decoder to decode the compression information. In other words, this helps improve efficiency of entire video frame transmission performed by the encoder and the decoder.

In this embodiment of this application, when the compression information is obtained by using the first neural network, the compression information carries the compression information of the first feature of the current video frame, and the reference frame of the current video frame is used only for the compression process of the first feature of the current video frame, and is not used for the generation process of the first feature of the current video frame. Therefore, after a decoder performs decompression based on the first compression information, to obtain the first feature of the current video frame, a reconstructed frame of the current video frame can be obtained without the reference frame of the current video frame. Therefore, when the compression information is obtained by using the first neural network, quality of the reconstructed frame of the current video frame does not depend on quality of a reconstructed frame of the reference frame of the current video frame, to prevent errors from being accumulated frame by frame, and improve quality of the reconstructed frame of the video frame. In addition, because the second feature of the current video frame is generated based on the reference frame of the current video frame, and a data amount corresponding to the second compression information of the second feature is less than a data amount corresponding to the first compression information of the first feature, the encoder may process different video frames in the current video sequence by using the first neural network and the second neural network, to combine advantages of the first neural network and the second neural network, so as to minimize a data amount that needs to be transmitted, and improve quality of the reconstructed frame of the video frame.

2. The encoder separately performs compression encoding by using the plurality of neural networks, and then determines the target compression information.

Figure 6:
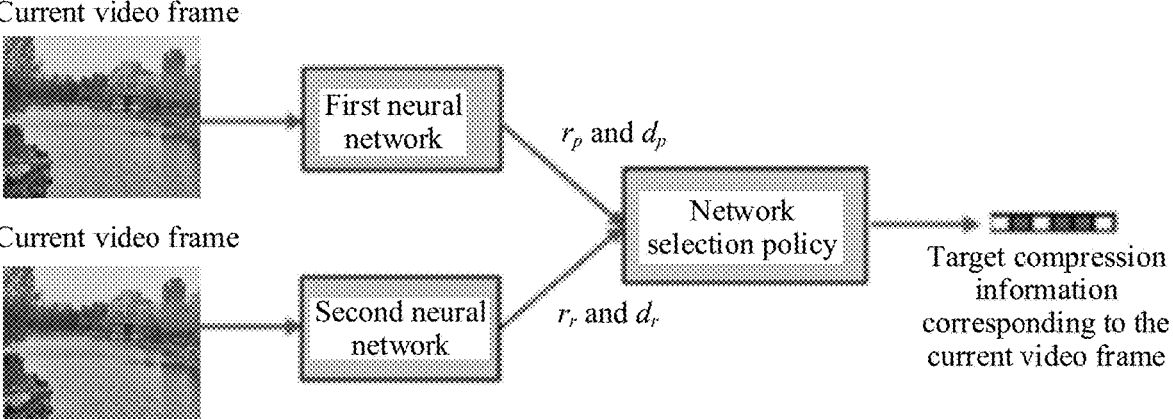
FIG. 6 is a schematic diagram of another principle of a video frame compression method according to an embodiment of this application.

In some embodiments of this application, the encoder separately performs compression encoding on the current video frame by using the plurality of neural networks, and then determines the target compression information corresponding to the current video frame. To more intuitively understand the solution, FIG. 6 is a schematic diagram of another principle of the video frame compression method according to an embodiment of this application. FIG. 6 is described by using an example in which a plurality of neural networks include only a first neural network and a second neural network. An encoder performs compression encoding on a current video frame by using the first neural network, to obtain first compression information (namely, $r_p$ in FIG. 6) of a first feature of the current video frame, and generates a reconstructed frame (namely, $d_p$ in FIG. 6) of the current video frame based on the first compression information. The encoder performs compression encoding on the current video frame by using the second neural network, to obtain second compression information (namely, $r_r$ in FIG. 6) of a second feature of the current video frame, and generates the reconstructed frame (namely, $d_r$ in FIG. 6) of the current video frame based on the second compression information. The encoder determines, based on $r_p$, $d_p$, $r_r$, $d_r$, and a network selection policy, target compression information corresponding to the current video frame from the first compression information and the second compression information. It should be understood that the example in FIG. 6 is merely for ease of understanding the solution, and is not intended to limit the solution.

Specifically, FIG. 7A is another schematic flowchart of a video frame compression method according to an embodiment of this application. The video frame compression method according to an embodiment of this application may include the following steps.

701: An encoder performs compression encoding on a current video frame by using a first neural network, to obtain first compression information of a first feature of the current video frame, where a reference frame of the current video frame is used for a compression process of the first feature of the current video frame.

In this embodiment of this application, after obtaining the current video frame, the encoder may perform compression encoding on the current video frame by using the first neural network in a plurality of neural networks, to obtain the first compression information of the first feature of the current video frame. For a meaning of the first feature of the current video frame, a meaning of the first compression information of the first feature of the current video frame, and a specific implementation of step 701, refer to the descriptions in the embodiment corresponding to FIG. 3. Details are not described herein again.

702: The encoder generates a first video frame by using the first neural network, where the first video frame is a reconstructed frame of the current video frame.

In some embodiments of this application, after generating the first compression information of the first feature of the current video frame by using the first neural network, the encoder may further perform decompression by using the first neural network, to generate the first video frame, where the first video frame is a reconstructed frame of the current video frame.

The first compression information includes compression information of the first feature of the current video frame, the reference frame of the current video frame is used for a decompression process of the first compression information, to obtain the first feature of the current video frame, and the first feature of the current video frame is used for a generation process of the reconstructed frame of the current video frame. In other words, after decompressing the first compression information, the encoder can obtain the reconstructed frame of the current video frame without the reference frame of the current video frame.

The first neural network may further include an entropy decoding layer and a decoding (Decoding) network, the entropy decoding layer is used to decompress the first compression information of the current video frame based on the reference frame of the current video frame, and the decoding network is used to generate the reconstructed frame of the current video frame based on the first feature of the current video frame.

Specifically, the encoder may predict, by using the entropy decoding layer, a feature of the current video frame based on reconstructed frames of N reference frames of the current video frame, to obtain a first predicted feature of the current video frame; and generate, by using the entropy decoding layer, probability distribution of the first feature of the current video frame based on the first predicted feature of the current video frame. The encoder performs entropy decoding, by using the entropy decoding layer, on the first compression information of the current video frame based on the probability distribution of the first feature of the current video frame, to obtain the first feature of the current video frame. The encoder further performs inverse transform decoding on the first feature of the current video frame by using a first decoding (decoding) network, to obtain the reconstructed frame of the current video frame. The first decoding network corresponds to a first encoding network, and the first decoding network may also be represented as a multi-layer convolutional network.

More specifically, a specific implementation in which the encoder generates the first predicted feature of the current video frame based on the reconstructed frames of the N reference frames of the current video frame is similar to a specific implementation in which the encoder generates the first predicted feature of the current video frame based on the reconstructed frames of the N reference frames of the current video frame. A specific implementation in which the encoder generates the probability distribution of the first feature of the current video frame based on the first predicted feature of the current video frame is similar to a specific implementation in which the encoder generates the probability distribution of the first feature of the current video frame based on the first predicted feature of the current video frame. For specific implementations of the foregoing steps, refer to the descriptions of step 302 in the embodiment corresponding to FIG. 3. Details are not described herein again.

703: The encoder performs compression encoding on the current video frame by using a second neural network, to obtain second compression information of a second feature of the current video frame, where the reference frame of the current video frame is used for a generation process of the second feature of the current video frame.

In this embodiment of this application, after obtaining the current video frame, the encoder may perform compression encoding on the current video frame by using the second neural network in the plurality of neural networks, to obtain the second compression information of the second feature of the current video frame. For a meaning of the second feature of the current video frame, a meaning of the second compression information of the second feature of the current video frame, and a specific implementation of step 701, refer to the descriptions in the embodiment corresponding to FIG. 3. Details are not described herein again.

704: The encoder generates a second video frame by using the second neural network, where the second video frame is a reconstructed frame of the current video frame.

In some embodiments of this application, after generating the second compression information of the second feature of the current video frame by using the second neural network, the encoder may further perform decompression by using the second neural network, to generate the second video frame, where the second video frame is a reconstructed frame of the current video frame.

The second neural network may further include an entropy decoding layer and a convolutional network, the entropy decoding layer is used to perform entropy decoding on the second compression information, and the convolutional network is used to perform the generation process of the reconstructed frame of the current video frame based on the reference frame of the current video frame and the second feature of the current video frame.

Specifically, the encoder may perform entropy decoding on the second compression information by using the entropy decoding layer, to obtain the second feature of the current video frame, that is, an optical flow of an original current video frame relative to the reference frame of the current video frame is obtained. Optionally, the second feature of the current video frame further includes a residual between the original current video frame and a predicted current video frame.

The encoder predicts the current video frame based on the reference frame of the current video frame and the optical flow of the original current video frame relative to the reference frame of the current video frame, to obtain the predicted current video frame; and further generates the second video frame (namely, the reconstructed frame of the current video frame) based on the predicted current video frame and the residual between the original current video frame and the predicted current video frame.

705: The encoder determines, based on the first compression information, the first video frame, the second compression information, and the second video frame, target compression information corresponding to the current video frame, where the determined target compression information is obtained by using the first neural network, and the determined target compression information is the first compression information; or the determined target compression information is obtained by using the second neural network, and the determined target compression information is the second compression information.

In this embodiment of this application, the encoder may calculate, based on the first compression information and the first video frame, a first score (namely, a first score corresponding to the first neural network) corresponding to the first compression information; calculate, based on the second compression information and the second video frame, a second score (namely, a second score corresponding to the second neural network) corresponding to the second compression information; and determine, based on the first score and the second score, the target compression information corresponding to the current video frame. If the determined target compression information is the first compression information obtained by using the first neural network, a target neural network is the first neural network. Alternatively, if the determined target compression information is the second compression information obtained by using the second neural network, a target neural network is the second neural network.

The first score indicates performance of compressing the current video frame by using the first neural network, and the second score indicates performance of compressing the current video frame by using the second neural network. Further, a smaller first score indicates better performance of processing the current video frame by using the first neural network, and a higher first score indicates poorer performance of processing the current video frame by using the first neural network. A smaller second score indicates better performance of processing the current video frame by using the second neural network, and a higher second score indicates poorer performance of processing the current video frame by using the second neural network.

The following describes a calculation process for the first score and the second score. Specifically, after obtaining the first compression information and the first video frame, the encoder may obtain a data amount of the first compression information; calculate a first compression rate of the first compression information relative to the current video frame, and calculate picture quality of the first video frame; and generate the first score based on the first compression rate of the first compression information relative to the current video frame and the picture quality of the first video frame. A larger data amount of the first compression information indicates a larger first score, and a smaller data amount of the first compression information indicates a smaller first score. Lower picture quality of the first video frame indicates a larger first score, and higher picture quality of the first video frame indicates a smaller first score.

Further, the first compression rate of the first compression information relative to the current video frame may be a ratio between the data amount of the first compression information and a data amount of the current video frame.

The encoder may calculate a structural similarity index (SSIM) between the current video frame and the first video frame, where the "structural similarity index" indicates the picture quality of the first video frame. It should be noted that the encoder may further measure the picture quality of the first video frame by using another indicator. For example, the "structural similarity index" may be replaced with a multi-scale structural similarity index (MS-SSIM), a peak signal-to-noise ratio (PSNR), another indicator, or the like. Indicators are not enumerated herein.

After obtaining the first compression rate of the first compression information relative to the current video frame and the picture quality of the first video frame, the encoder may perform weighted summation on the first compression rate and the picture quality of the first video frame, to generate the first score corresponding to the first neural network. It should be noted that, after obtaining the first compression rate and the picture quality of the first video frame, the encoder may alternatively obtain the first score in another manner, for example, multiplying the first compression rate by the picture quality of the first video frame. A specific manner of obtaining the first score based on the first compression rate and the picture quality of the first video frame may be flexibly determined based on an actual application scenario. This is not enumerated herein.

Correspondingly, after obtaining the second compression information and the second video frame, the encoder may calculate a data amount of the second compression information and picture quality of the second video frame, and then generate the second score based on the data amount of the second compression information and the picture quality of the second video frame. A manner of generating the second score is similar to a manner of generating the first score. For details, refer to the foregoing descriptions. Details are not described herein again.

The following describes a process of determining, based on the first score and the second score, the target compression information corresponding to the current video frame. Specifically, in an implementation, after obtaining the calculated first score corresponding to the first compression information and the calculated second score corresponding to the second compression information, the encoder may select a smaller score in the first score and the second score as a target score, and determine compression information corresponding to the target score as the target compression information. The encoder performs the foregoing operations for each video frame in the video sequence, to obtain target compression information corresponding to each video frame.

Figure 7B:
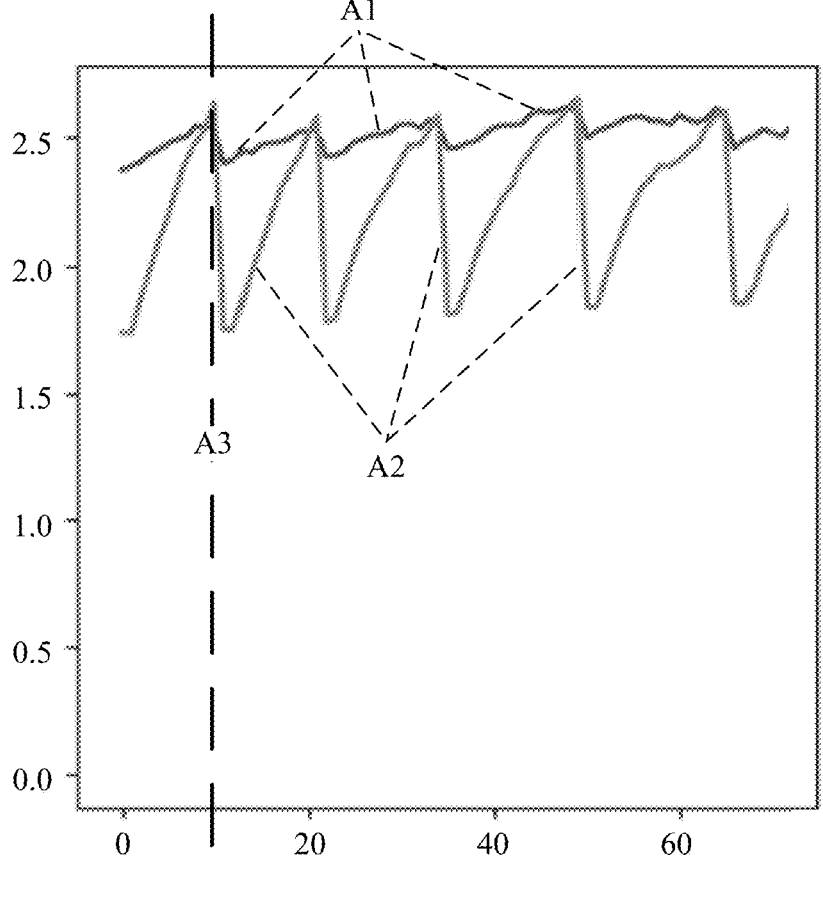
FIG. 7B is a schematic diagram of a first score and a second score in a video frame compression method according to an embodiment of this application.

For a finding of a person skilled in the art during research, refer to FIG. 7B. In another implementation, FIG. 7B is a schematic diagram of a first score and a second score in a video frame compression method according to an embodiment of this application. In FIG. 7B, a horizontal coordinate indicates location information of one video frame in the current video sequence, a vertical coordinate indicates a score corresponding to each video frame, A1 indicates a broken line corresponding to the first score in a process of compressing a plurality of video frames in the current video sequence, and A2 indicates a broken line corresponding to the second score in a process of compressing the plurality of video frames in the current video sequence. A3 indicates the first score and the second score that are obtained by separately compressing a video frame 1 by using the first neural network and the second neural network. It can be learned from FIG. 7B that a score obtained by processing the video frame 1 by using the first neural network is smaller. Therefore, the encoder uses the first neural network to process the video frame 1. After the video frame 1 is processed by using the first neural network, both the first score and the second score corresponding to a video frame 2 (namely, a next video frame of the video frame 1 in the current video sequence) decrease greatly. In other words, each time the first neural network is used to compress one video frame, a new period is triggered to start. In one period, the first score value increases linearly, the second score value also increases linearly, and a growth rate of the second score is larger than a growth rate of the first score. It should be understood that the example in FIG. 7B is merely for ease of understanding the solution, and is not intended to limit the solution.

To more intuitively understand the solution, in one period, a plurality of first scores may be fitted into the following formula:

$$l_{pi} + t * k_{pi} \qquad (1).$$

$l_{pi}$ indicates a start point of a straight line corresponding to the plurality of first scores in one period, namely, an offset of a first fitting formula corresponding to the plurality of first scores, $k_{pi}$ indicates a slope of the straight line corresponding to the plurality of first scores in one period, namely, a coefficient of the first fitting formula corresponding to the plurality of first scores, and t indicates a quantity of video frames between a first video frame in one period and any current video frame in the period. For example, a value of t corresponding to a second video frame in one period is 1.

In one period, a plurality of second scores may be fitted into the following formula:

$$l_{pr} + t * k_{pr} \qquad (2).$$

$l_{pi}$ indicates a start point of a straight line corresponding to the plurality of second scores in one period, namely, an offset of a second fitting formula corresponding to the plurality of second scores, and $k_{pi}$ indicates a slope of the straight line corresponding to the plurality of second scores in one period, namely, a coefficient of the second fitting formula corresponding to the plurality of second scores. For a meaning of t, refer to descriptions of the formula (1).

A total score corresponding to one period may be fitted into the following formula:

$$loss = l_{pr} + (l_{pr} + k_{pr}) + \cdots + (l_{pr} + (T-2)*k_{pr}) + l_{pi} + (T-1)*k_{pi} \qquad (3).$$

loss indicates a sum of all scores in one period, and T indicates a total quantity of video frames in one period. When the first neural network is used to compress one video frame, a new period is triggered to enter, first T−1 video frames in one period are compressed by using the second neural network, and a last video frame is compressed by using the first neural network. Therefore, $l_{pr} + (l_{pr} + k_{pr}) + (T-2)*k_{pr})$ indicates a sum of at least one second score corresponding to all video frames compressed by using the second neural network in one period, and $l_{pi} + (T-1)*k_{pi}$ indicates a first score corresponding to a last video frame in one period.

Then, the encoder may use one period as a calculation unit, and an objective is to minimize an average value of total scores in each period. To more intuitively understand the solution, the following formulas are used:

$$\min_{T} \frac{loss}{T}. \qquad (4)$$

For meanings of T and loss, refer to the descriptions of the formula (3). Details are not described herein again.

$$\min_{T} \frac{loss}{T}$$

indicates that an objective is to minimize an average value of total scores in one period.

The following formula may be obtained by substituting the formula (3) into the formula (4):

$$\min_{T}\left(\frac{k_{pr}}{2}*T + \frac{k_{pr} - k_{pi} + l_{pi} - l_{pr}}{T}\right) = \min_{T}\left(a*T + \frac{b}{T}\right). \qquad (5)$$

A person skilled in the art finds during research that when $l_{pi} > l_{pr}$ and $k_{pr} > k_{pi}$, b>0 and a>0. Therefore, when $$T = \sqrt{\frac{b}{a}},$$

the average value of the total scores in each period is the smallest.

Inference is performed according to the formulas. Specifically, in an implementation, for any one of a plurality of periods corresponding to the current video sequence, the encoder first obtains two first scores corresponding to first two current video frames in one period, and obtains two second scores corresponding to the first two current video frames in the period. For a manner of obtaining the first score corresponding to the current video frame and the second score corresponding to the current video frame, refer to the foregoing descriptions. Details are not described herein again.

The encoder may generate, based on the two first scores corresponding to the first two current video frames in the period, a coefficient and an offset, namely, values of $l_{pi}$ and $k_{pi}$, of the first fitting formula corresponding to the plurality of first scores in the period. The encoder generates, based on the two second scores corresponding to the first two current video frames in one period, a coefficient and an offset, namely, values of $l_{pr}$ and $k_{pr}$, of the second fitting formula corresponding to the plurality of second scores in one period.

The following describes a process in which after obtaining the coefficient and the offset of the first fitting formula and the coefficient and the offset of the second fitting formula, the encoder determines the target compression information of the current video frame. In an implementation, when t is equal to 0, the encoder determines the second compression information corresponding to the first video frame in the period as the target compression information of the current video frame (namely, the first video frame in the period), that is, determines the target neural network corresponding to the first video frame in the period as the second neural network; and continues to process a case in which t is equal to 1.

When t is equal to 1, that is, after obtaining the two first scores corresponding to the first two current video frames in the period, and obtaining the two second scores corresponding to the first two current video frames in the period, the encoder may calculate the value of T according to the formula (5). If T<3, the encoder determines the first compression information corresponding to the second video frame in the period as the target compression information of the current video frame (namely, the second video frame in the period), that is, determines the target neural network corresponding to the second video frame in the period as the first neural network. A next period is triggered to enter.

If T≥3, the encoder determines the second compression information corresponding to the second video frame in the period as the target compression information of the current video frame (namely, the second video frame in the period), that is, determines the target neural network corresponding to the second video frame in the period as the second neural network; and continues to process a case in which t is equal to 2.

When t is equal to 2, the encoder obtains a first score and a second score that correspond to a third video frame (namely, an example of the current video frame) in one period. For a specific manner of generating the first score and the second score that correspond to the current video frame, refer to the foregoing descriptions. Details are not described herein again. The encoder recalculates the coefficient and the offset (that is, recalculating the values of $l_{pi}$ and $k_{pi}$) of the first fitting formula based on three first scores corresponding to first three video frames in one period, recalculates the coefficient and the offset (that is, recalculating the values of $l_{pr}$ and $k_{pr}$) of the second fitting formula based on three second scores corresponding to the first three video frames in the period, and recalculates the value of T based on the recalculated coefficient and the recalculated offset of the first fitting formula, and the recalculated coefficient and the recalculated offset of the second fitting formula.

If T<t+2, the encoder may determine first compression information corresponding to a third video frame in the period as the target compression information of the current video frame (namely, the third video frame in the period), that is, determine a target neural network corresponding to the third video frame in the period as the first neural network. A next period is triggered to enter.

If T≥t+2, the encoder may determine second compression information corresponding to the third video frame in the period as the target compression information of the current video frame (namely, the third video frame in the period), that is, determine the target neural network corresponding to the third video frame in the period as the second neural network; and continues to process a case in which t is equal to 3.

When the value of t is 3, 4, or a larger value, a processing manner of the encoder is similar to a processing manner when t is equal to 2. Details are not described herein again.

In another implementation, when t is equal to 0, the encoder determines the second compression information corresponding to the first video frame in the period as the target compression information of the current video frame (namely, the first video frame in the period), that is, determines the target neural network corresponding to the first video frame in the period as the second neural network; and continues to process a case in which t is equal to 1.

When t is equal to 1, after obtaining two first scores corresponding to first two current video frames in one period, and obtaining two second scores corresponding to the first two current video frames in the period, the encoder may calculate the coefficient and the offset (namely, values of $l_{pi}$ and $k_{pi}$) of the first fitting formula, and the coefficient and the offset (namely, values of $l_{pr}$ and $k_{pr}$) of the second fitting formula; and calculate, according to the formula (5), a first average value of total scores of the period that are obtained by compressing the second video frame (namely, an example of the current video frame) in the period by using the first neural network, and calculate a second average value of total scores of the period that are obtained by compressing the second video frame (namely, an example of the current video frame) in the period by using the second neural network and compressing a third video frame in the period by using the first neural network.

If the first average value is greater than the second average value, the encoder determines target compression information corresponding to the second video frame in the period as the first compression information of the current video frame, that is, determines the target compression information corresponding to the second video frame in the period as the first neural network. A new period is triggered to enter.

If the first average value is equal to the second average value, the encoder may determine first compression information corresponding to the second video frame in the period as the target compression information of the current video frame, that is, determine a target neural network corresponding to the second video frame in the period as the first neural network. A new period is triggered to enter. Alternatively, the encoder may determine second compression information corresponding to the second video frame in the period as the target compression information of the current video frame, that is, determine a target neural network corresponding to the second video frame in the period as the second neural network; and continue to process a case in which t is equal to 2.

If the first average value is less than the second average value, the encoder determines second compression information corresponding to the second video frame in the period as the target compression information of the current video frame, that is, determines a target neural network corresponding to the second video frame in the period as the second neural network; and continues to process a case in which t is equal to 2.

When t is equal to 2, the encoder may obtain the first score corresponding to the third video frame in the period, and obtain the second scores corresponding to the first two current video frames in the period. A specific manner of generating the first score and the second score that correspond to the current video frame is not described herein again. The encoder recalculates the coefficient and the offset (that is, recalculating the values of $l_{pi}$ and $k_{pi}$) of the first fitting formula based on three first scores corresponding to first three video frames in one period; recalculates the coefficient and the offset (that is, recalculating the values of $l_{pr}$ and $k_{pr}$) of the second fitting formula based on three second scores corresponding to the first three video frames in the period; and calculates an updated first average value and an updated second average value based on the recalculated coefficient and the recalculated offset of the first fitting formula, and the recalculated coefficient and the recalculated offset of the second fitting formula. The updated first average value is an average value of total scores of the period that are obtained by compressing the third video frame (namely, an example of the current video frame) in the period by using the first neural network, and the updated second average value is an average value of total scores of the period that are obtained by compressing the third video frame (namely, an example of the current video frame) in the period by using the second neural network and compressing a fourth video frame in the period by using the first neural network.

If the updated first average value is greater than the updated second average value, the encoder determines target compression information corresponding to the third video frame in the period as the first compression information of the current video frame, that is, determines the target compression information corresponding to the third video frame in the period as the first neural network. A new period is triggered to enter.

If the updated first average value is equal to the updated second average value, the encoder may determine first compression information corresponding to the third video frame in the period as the target compression information of the current video frame, that is, determine a target neural network corresponding to the third video frame in the period as the first neural network. A new period is triggered to enter. Alternatively, the encoder may determine second compression information corresponding to the third video frame in the period as the target compression information of the current video frame, that is, determine a target neural network corresponding to the third video frame in the period as the second neural network; and continue to process a case in which t is equal to 3.

If the updated first average value is less than the updated second average value, the encoder determines second compression information corresponding to the third video frame in the period as the target compression information of the current video frame, that is, determines a target neural network corresponding to the third video frame in the period as the second neural network; and continues to process a case in which t is equal to 3.

When the value of t is 3, 4, or a larger value, a processing manner of the encoder is similar to a processing manner when t is equal to 2. Details are not described herein again.

In this embodiment of this application, a person skilled in the art discovers a change rule of the first score and the second score in a single period during research, and uses a lowest average value of total scores in one period as an optimization objective. In other words, when target compression information corresponding to each current video frame is determined, both the score of the current video frame and the average value of the scores in the entire period need to be considered, to further reduce scores corresponding to all video frames in the entire current video sequence. This further improves performance of the compression information corresponding to the entire current video sequence. In addition, two different implementations are provided, to improve implementation flexibility of the solution.

In another implementation, the encoder may alternatively use one period as a calculation unit, and an objective is to minimize an average value of total scores in each period. For a specific implementation when t is equal to 0 and a specific implementation when t is equal to 1, refer to the descriptions of the first implementation in the case B. Details are not described herein again.

If t=2, the encoder does not obtain the first score and second score that correspond to the third video frame (namely, an example of the current video frame) in the period, and does not recalculate the coefficient and the offset of the first fitting formula, and the coefficient and the offset of the second fitting formula. However, the encoder directly obtains the value of T obtained through calculation when t=1. If T<t+2, the encoder may determine the first compression information corresponding to the third video frame in the period as the target compression information of the current video frame (namely, the third video frame in the period), that is, determine the target neural network corresponding to the third video frame in the period as the first neural network. A next period is triggered to enter.

If T≥t+2, the encoder may determine the second compression information corresponding to the third video frame in the period as the target compression information of the current video frame (namely, the third video frame in the period), that is, determine the target neural network corresponding to the third video frame in the period as the second neural network; and continues to process a case in which t is equal to 3.

When the value of t is 3, 4, or a larger value, a processing manner of the encoder is similar to a processing manner when t is equal to 2. Details are not described herein again.

Figure 7C:
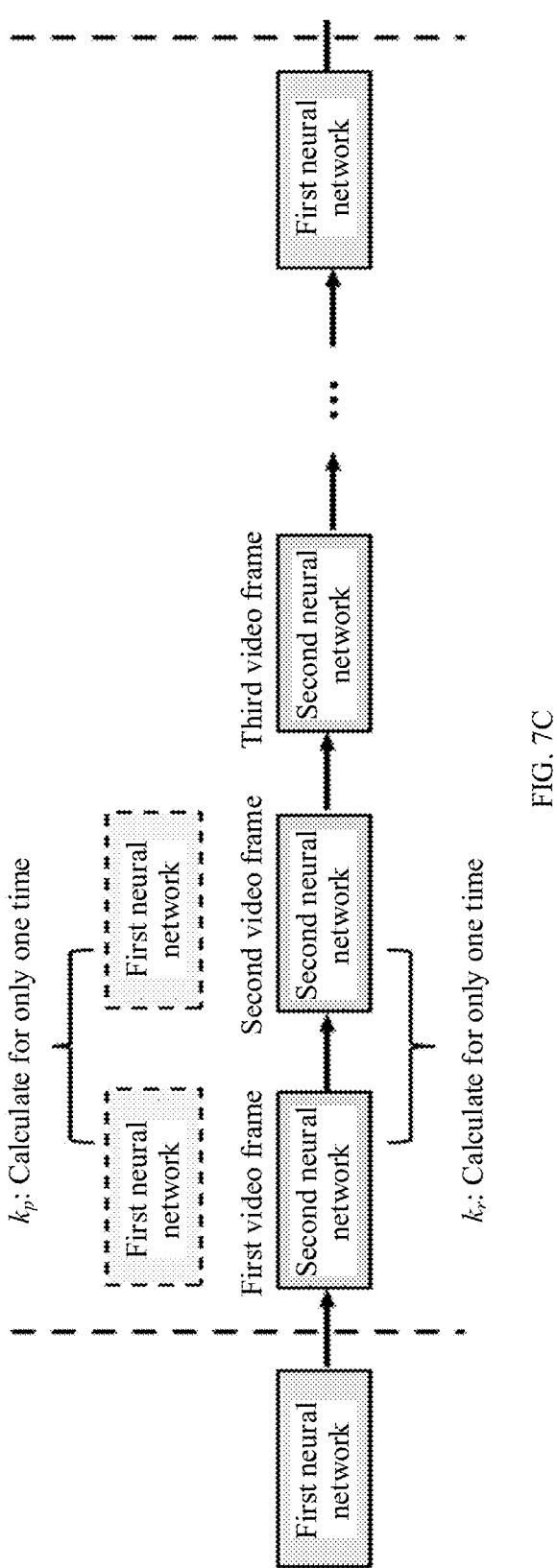
FIG. 7C is a schematic diagram of calculating a coefficient and an offset of a first fitting formula and a coefficient and an offset of a second fitting formula in a video frame compression method according to an embodiment of this application.

To more intuitively understand the solution, FIG. 7C is a schematic diagram of calculating the coefficient and the offset of the first fitting formula and the coefficient and the offset of the second fitting formula in the video frame compression method according to an embodiment of this application. As shown in FIG. 7C, a video frame in one period is processed between two dashed lines in a vertical direction. In the period, compression encoding is performed on a plurality of video frames by using the second neural network, and compression encoding is performed on a last video frame in the period by using the first neural network. First, the encoder obtains two first scores corresponding to first two current video frames (namely, a first video frame and a second video frame) in one period, and obtains two second scores corresponding to the first two current video frames in the period, the encoder may calculate the coefficient and the offset (namely, values of $l_{pi}$ and $k_{pi}$) of the first fitting formula, and the coefficient and the offset (namely, values of $l_{pr}$ and $k_{pr}$) of the second fitting formula; and calculates an optimal value of T in the period according to the formula (5). When t=2, the encoder does not obtain a first score and a second score that correspond to a third video frame in the period, and does not recalculate the coefficient and the offset of the first fitting formula and the coefficient and the offset of the second fitting formula. It should be understood that the example in FIG. 7C is merely for ease of understanding the solution, and is not intended to limit the solution.

In this embodiment of this application, in one period, the coefficient and the offset of the first fitting formula and the coefficient and the offset of the second fitting formula are obtained through calculation based on only the two first scores and the two second scores that correspond to the first two video frames in the period. Then, a lowest average value of total scores in the period is used as an optimization objective, to obtain a quantity of optimal video frames in the current period. Because a lowest average value of total scores in the period is still used as an optimization objective, scores corresponding to all video frames in the current video sequence can further be reduced. In addition, when t is greater than or equal to 2, the coefficient and the offset of the first fitting formula and the coefficient and the offset of the second fitting formula are not updated. This saves time for calculating parameters of the first fitting formula and the second fitting formula, and further improves efficiency of generating the compression information of the current video sequence.

In another implementation, the encoder may alternatively use one period as a calculation unit, and an objective is to minimize an average value of total scores in each period. For a specific implementation when t is equal to 0 and a specific implementation when t is equal to 1, refer to the descriptions of the first implementation in the case B. Details are not described herein again.

If t=2, the encoder obtains only the second score corresponding to the third video frame (namely, an example of the current video frame) in the period, and does not obtain the first score corresponding to the third video frame (namely, an example of the current video frame) in the period. Further, the encoder recalculates only the coefficient and the offset of the second fitting formula, and does not recalculate the coefficient and the offset of the first fitting formula. The encoder calculates, according to the first fitting formula that is not updated and the updated second fitting formula, the value of T when t=2. If T G t+2, the encoder may determine the first compression information corresponding to the third video frame in the period as the target compression information of the current video frame (namely, the third video frame in the period), that is, determine the target neural network corresponding to the third video frame in the period as the first neural network. A next period is triggered to enter.

If T≥t+2, the encoder may determine the second compression information corresponding to the third video frame in the period as the target compression information of the current video frame (namely, the third video frame in the period), that is, determine the target neural network corresponding to the third video frame in the period as the second neural network; and continues to process a case in which t is equal to 3.

When the value oft is 3, 4, or a larger value, a processing manner of the encoder is similar to a processing manner when t is equal to 2. Details are not described herein again.

In this embodiment of this application, compression information that finally needs to be sent is selected based on the first compression information of at least one current video frame, the first video frame, the second compression information of the current video frame, and the second video frame. Compared with a manner in which a target neural network is determined from a first neural network and a second neural network according to a preset network selection policy, and then target compression information is generated by using the target neural network, this implementation can improve performance of compression information corresponding to an entire current video sequence as much as possible.

706: The encoder generates indication information corresponding to the target compression information, where the indication information indicates that the target compression information is obtained by using the target neural network which is either the first neural network or the second neural network.

707: The encoder sends the target compression information of the current video frame.

708: The encoder sends the indication information corresponding to the target compression information of the current video frame.

In this embodiment of this application, step 706 and step 708 are mandatory steps. For specific implementations of step 706 to step 708, refer to descriptions of step 303 to step 305 in the embodiment corresponding to FIG. 3. Details are not described herein again. It should be noted that an execution sequence of step 707 and step 708 is not limited in this embodiment of this application. Step 707 and step 708 may be performed simultaneously, step 707 may be performed before step 708, or step 708 may be performed before step 707.

In this embodiment of this application, compression information that finally needs to be sent is selected from the first compression information and the second compression information based on the first compression information of at least one current video frame, the first video frame, the second compression information of the current video frame, and the second video frame. Compared with a manner in which a target neural network is determined from a plurality of neural networks according to a network selection policy, and then target compression information is generated by using the target neural network, this implementation can improve performance of compression information corresponding to an entire current video sequence as much as possible.

In embodiments of this application, FIG. 8 is another schematic flowchart of a video frame compression method according to an embodiment of this application. The video frame compression method according to an embodiment of this application may include the following steps.

801: An encoder performs compression encoding on a third video frame by using a first neural network, to obtain first compression information corresponding to the third video frame, where the first compression information includes compression information of a first feature of the third video frame, and a reference frame of the third video frame is used for a compression process of the first feature of the third video frame.

In this embodiment of this application, when processing the third video frame of a current video frame, the encoder determines that target compression information of the third video frame is the first compression information, generated by the first neural network, corresponding to the third video frame. The third video frame is a video frame in the current video sequence, and a concept of the third video frame is similar to a concept of the current video frame. For a meaning of the first feature of the third video frame, refer to the descriptions of the meaning of "the first feature of the current video frame" in the embodiment corresponding to FIG. 3. For a meaning of "the reference frame of the third video frame", a specific implementation in which the encoder generates the first compression information corresponding to the third video frame, and a specific implementation in which the encoder determines compression information, of the third video frame, that finally needs to be sent to a decoder, refer to the descriptions in the embodiment corresponding to FIG. 3. Details are not described herein again.

802: The encoder performs compression encoding, by using a second neural network, on a fourth video frame, to obtain second compression information corresponding to the fourth video frame, where the second compression information includes compression information of a second feature of the fourth video frame, a reference frame of the fourth video frame is used for a generation process of the second feature of the fourth video frame, and the third video frame and the fourth video frame are different video frames in a same video sequence.

In this embodiment of this application, when processing the fourth video frame of the current video frame, the encoder determines that target compression information of the fourth video frame is the second compression information, generated by the second neural network, corresponding to to the fourth video frame. The fourth video frame is a video frame in the current video sequence, a concept of the fourth video frame is similar to a concept of the current video frame, and the third video frame and the fourth video frame are different video frames in a same current video sequence.

For a meaning of the second feature of the fourth video frame, refer to the descriptions of the meaning of "the second feature of the current video frame" in the embodiment corresponding to FIG. 3. For a meaning of "the reference frame of the fourth video frame", a specific implementation in which the encoder generates the second compression information corresponding to the fourth video frame, and a specific implementation in which the encoder determines compression information, of the fourth video frame, that finally needs to be sent to the decoder, refer to the descriptions in the embodiment corresponding to FIG. 3. Details are not described herein again.

It should be noted that a specific implementation sequence of step 801 and step 802 is not limited in this embodiment of this application. Step 801 may be performed before step 802, or step 802 may be performed before step 801. A specific sequence needs to be determined based on an actual application scenario, and is not limited herein.

803: The encoder generates indication information, where the indication information indicates that the first compression information is obtained by using the first neural network, and that the second compression information is obtained by using the second neural network.

In this embodiment of this application, step 803 is similar to step 303 in the embodiment corresponding to FIG. 3. After generating target compression information of one or more current video frames in the current video sequence, the encoder may generate indication information that one-to-one corresponds to one or more pieces of target compression information. The target compression information is specifically the first compression information or the second compression information. For meanings of the target compression information and the indication information, refer to the descriptions of step 303 in the embodiment corresponding to FIG. 3. Details are not described herein again.

Specifically, the encoder may first perform step 801 and step 802 for a plurality of times, and then generate, by using step 803, the indication information that one-to-one corresponds to the target compression information of each video frame in the current video sequence. Alternatively, the encoder may perform step 803 each time step 801 is performed or step 802 is performed. Alternatively, the encoder may perform step 803 once after step 801 and/or step 802 are/is performed for a preset quantity of times, where the preset quantity of times is an integer greater than 1, for example, 3, 4, 5, 6, or another value. This is not limited herein.

It should be noted that in step 801 or step 802, if the encoder determines the target compression information of the current video frame (namely, the third video frame or the fourth video frame) in the manner shown in the embodiment corresponding to FIG. 7A, step 803 is a mandatory step. In step 801 or step 802, if the encoder obtains the target compression information of the current video frame (namely, the third video frame or the fourth video frame) in the manner shown in the embodiment corresponding to FIG. 3, step 803 is an optional step. For a specific implementation of step 803, refer to descriptions of step 303 in the embodiment corresponding to FIG. 3. Details are not described herein again.

804: The encoder sends the target compression information corresponding to the current video frame, where the target compression information is the first compression information or the second compression information.

In this embodiment of this application, after generating at least one piece of first compression information that one-to-one corresponds to at least one third video frame, and/or after generating at least one piece of second compression information that one-to-one corresponds to at least one fourth video frame, the encoder may send, to the decoder under constraint of the FTP protocol, at least one piece of target compression information (namely, the first compression information and/or the second compression information) that one-to-one corresponds to at least one current video frame (namely, the third video frame and/or the fourth video frame). For a specific implementation of step 804, refer to descriptions of step 304 in the embodiment corresponding to FIG. 3. Details are not described herein again.

To more intuitively understand the solution, FIG. 9 is a schematic diagram of the video frame compression method according to an embodiment of this application. As shown in FIG. 9, the encoder performs compression encoding on some video frames in the current video sequence by using a third neural network, performs compression encoding on other video frames in the current video sequence by using a fourth neural network, and then sends target compression information corresponding to all current video frames in the current video sequence. The target compression information is the first compression information or the second compression information. It should be understood that the example in FIG. 9 is merely for ease of understanding the solution, and is not intended to limit the solution.

805: The encoder sends indication information corresponding to the current video frame.

In this embodiment of this application, step 805 is an optional step. If step 803 is not performed, step 805 is not performed. If step 803 is performed, step 805 is performed. If step 805 is performed, step 805 and step 804 may be performed simultaneously. For a specific implementation of step 805, refer to descriptions of step 305 in the embodiment corresponding to FIG. 3. Details are not described herein again.

In this embodiment of this application, when the first neural network is used to perform compression encoding on the third video frame in the current video sequence, the first compression information carries compression information of the first feature of the current video frame, and the reference frame of the current video frame is used only for the compression process of the first feature of the current video frame, and is not used for the generation process of the first feature of the current video frame. Therefore, after the decoder performs decompression based on the first compression information, to obtain the first feature of the current video frame, a reconstructed frame of the current video frame can be obtained without the reference frame of the current video frame. Therefore, when the target compression information is obtained by using the first neural network, quality of the reconstructed frame of the current video frame does not depend on quality of a reconstructed frame of the reference frame of the current video frame, to prevent errors from being accumulated frame by frame, and improve quality of the reconstructed frame of the video frame. When the second neural network is used to perform compression encoding on the fourth video frame, because the second feature of the fourth video frame is generated based on the reference frame of the fourth video frame, a data amount corresponding to the second compression information is less than a data amount corresponding to the first compression information. In addition, both the first neural network and the second neural network are used to process different video frames in the current video sequence, to combine advantages of the first neural network and the second neural network, so as to minimize a data amount that needs to be transmitted, and improve quality of the reconstructed frame of the video frame.

With reference to FIG. 10A to FIG. 12, the following describes in detail steps performed by the decoder. FIG. 10A is a schematic flowchart of a video frame decompression method according to an embodiment of this application. The video frame decompression method according to an embodiment of this application may include the following steps.

1001: A decoder receives target compression information corresponding to at least one current video frame.

In this embodiment of this application, an encoder may send, to the decoder under constraint of the FTP protocol, at least one piece of target compression information corresponding to the at least one current video frame in a current video frame. Correspondingly, the decoder may receive the at least one piece of target compression information corresponding to the at least one current video frame in the current video frame.

Specifically, in an implementation, the decoder may directly receive, from the encoder, the target compression information corresponding to the at least one current video frame. In another implementation, the decoder may alternatively receive, from an intermediate device such as a server or a management center, the target compression information corresponding to the at least one current video frame.

1002: The decoder receives indication information corresponding to the target compression information.

In some embodiments of this application, if the encoder sends at least one piece of indication information that one-to-one corresponds to the at least one piece of target compression information. Correspondingly, the decoder may receive the at least one piece of indication information that one-to-one corresponds to the at least one piece of target compression information. For a meaning of the indication information, refer to descriptions in the embodiment corresponding to FIG. 3. Details are not described herein again.

It should be noted that step 1002 is an optional step. If step 1002 is performed, an execution sequence of step 1001 and step 1002 is not limited in this embodiment of this application, and step 1001 and step 1002 may be performed simultaneously.

1003: The decoder selects, from a plurality of neural networks, a target neural network corresponding to the current video frame, where the plurality of neural networks include a third neural network and a fourth neural network.

In this embodiment of this application, after obtaining the at least one piece of target compression information corresponding to the at least one current video frame, the decoder needs to select the target neural network from the plurality of neural networks to perform decompression, so as to obtain a reconstructed frame of each current video frame. The plurality of neural networks include the third neural network and the fourth neural network, and both the third neural network and the fourth neural network are neural networks used to perform decompression.

Further, the third neural network corresponds to the first neural network. In other words, if target compression information of a current video frame is first compression information of the current video frame obtained by using the first neural network, the decoder needs to decompress the first compression information of the current video frame by using the third neural network, to obtain a reconstructed frame of the current video frame.

The fourth neural network corresponds to the second neural network. In other words, if target compression information of a current video frame is second compression information of the current video frame obtained by using the second neural network, the decoder needs to decompress the second compression information of the current video frame by using the fourth neural network, to obtain a reconstructed frame of the current video frame.

It should be noted that a specific implementation in which the decoder decompresses the target compression information by using the third neural network or the fourth neural network is described in a subsequent embodiment, and details are not described herein.

The following describes a process in which the decoder determines the target neural network. Specifically, in an implementation, if step 1002 is performed, the decoder may directly determine, based on a plurality of pieces of indication information that one-to-one correspond to a plurality of pieces of target compression information, that a target neural network corresponding to each piece of target compression information is the first neural network or the second neural network.

To more intuitively understand the solution, FIG. 10B is another schematic flowchart of the video frame decompression method according to an embodiment of this application. As shown in FIG. 10B, after obtaining the target compression information corresponding to the current video frame and the indication information corresponding to the target compression information, the decoder may determine the target neural network from the third neural network and the fourth neural network based on the indication information corresponding to the target compression information; and decompress, by using the target neural network, the target compression information corresponding to the current video frame, to obtain the reconstructed frame of the current video frame. It should be understood that the example in FIG. 10B is merely for ease of understanding the solution, and is not intended to limit the solution.

In another implementation, if step 1002 is not performed, the decoder may obtain location information of a current video frame, in a current video sequence, that one-to-one corresponds to each piece of target compression information, where the location information indicates that the current video frame that one-to-one corresponds to each piece of target compression information is an Xth frame in the current video sequence; and selects, according to a preset rule, the target neural network corresponding to the location information of the current video sequence from the third neural network and the fourth neural network.

For a meaning of the location information, refer to descriptions in the embodiment corresponding to FIG. 3. Details are not described herein again. The preset rule may be alternately selecting the third neural network or the fourth neural network according to a specific rule. In other words, the decoder performs compression encoding on n video frames of the current video frame by using the third neural network, and then performs compression encoding on m video frames of the current video frame by using the fourth neural network. Alternatively, after performing compression encoding on m video frames of the current video frame by using the fourth neural network, the encoder performs compression encoding on n video frames of the current video frame by using the third neural network. Values of both n and m may be integers greater than or equal to 1, and the values of n and m may be the same or different.

A specific implementation in which the decoder selects, according to the preset rule, the target neural network corresponding to the location information of the current video sequence from the plurality of neural networks including the third neural network and the fourth neural network is similar to a specific implementation in which the encoder selects, according to the network selection policy, the target neural network corresponding to the location information of the current video sequence from the plurality of neural networks including the first neural network and the second neural network. A difference lies in that the "first neural network" in the embodiment corresponding to FIG. 3 is replaced with the "third neural network" in this embodiment, and the "second neural network" in the embodiment corresponding to FIG. 3 is replaced with the "fourth neural network" in this embodiment. For details, refer to the descriptions in the embodiment corresponding to FIG. 3. Details are not described herein again.

1004: The decoder performs decompression, by using the target neural network, based on the target compression information, to obtain the reconstructed frame of the current video frame. If the target neural network is the third neural network, the target compression information includes first compression information of a first feature of the current video frame. A reference frame of the current video frame is used for a decompression process of the first compression information, to obtain the first feature of the current video frame. The first feature of the current video frame is used for a generation process of the reconstructed frame of the current video frame. If the target neural network is the fourth neural network, the target compression information includes second compression information of a second feature of the current video frame, the second compression information is used by the decoder to perform decompression, to obtain the second feature of the current video frame. The reference frame of the current video frame and the second feature of the current video frame are used for the generation process of the reconstructed frame of the current video frame.

In this embodiment of this application, if the target neural network is the third neural network, the target compression information includes the first compression information of the first feature of the current video frame, and the third neural network includes an entropy decoding layer and a decoding network. The entropy decoding layer is used to perform entropy decoding on the first compression information of the current video frame based on the reference frame of the current video frame, and the decoding network is used to generate the reconstructed frame of the current video frame based on the first feature of the current video frame.

Specifically, when the target neural network is the third neural network, for a specific implementation in which the decoder performs step 1004, refer to the descriptions of step 702 in the embodiment corresponding to FIG. 7A. A difference lies in that, in step 702, the encoder performs decompression, by using the first neural network, based on the first compression information corresponding to the current video frame, to obtain the reconstructed frame of the current video frame. However, in step 1004, the decoder performs decompression, by using the third neural network, based on the first compression information corresponding to the current video frame, to obtain the reconstructed frame of the current video frame.

If the target neural network is the fourth neural network, the target compression information includes the second compression information of the second feature of the current video frame, and the fourth neural network includes an entropy decoding layer and a convolutional network. The entropy decoding layer is used to perform entropy decoding on the second compression information, and the convolutional network is used to perform the generation process of the reconstructed frame of the current video frame based on the reference frame of the current video frame and the second feature of the current video frame.

Specifically, when the target neural network is the fourth neural network, for a specific implementation in which the decoder performs step 1004, refer to the descriptions of step 704 in the embodiment corresponding to FIG. 7A. A difference lies in that, in step 704, the encoder performs decompression, by using the second neural network, based on the second compression information corresponding to the current video frame, to obtain the reconstructed frame of the current video frame. However, in step 1004, the decoder performs decompression, by using the fourth neural network, based on the second compression information corresponding to the current video frame, to obtain the reconstructed frame of the current video frame.

An embodiment of this application further provides a video frame decompression method. FIG. 11 is another schematic flowchart of a video frame decompression method according to an embodiment of this application. The video frame decompression method according to an embodiment of this application may include the following steps.

1101: A decoder receives target compression information corresponding to a current video frame, where the target compression information is first compression information or second compression information.

1102: The decoder receives indication information corresponding to the current video frame, where the indication information indicates that the first compression information is obtained through decompression by using the third neural network, and that the second compression information is obtained through decompression by using the fourth neural network.

For specific implementations of step 1101 and step 1102 in this embodiment of this application, refer to the descriptions of step 1001 and step 1002 in the embodiment corresponding to FIG. 10A. Details are not described herein again.

1103: The decoder decompresses the first compression information of a third video frame by using the third neural network, to obtain a reconstructed frame of the third video frame.

In this embodiment of this application, the decoder selects the third neural network from a plurality of neural networks, to decompress the first compression information of the third video frame. For a specific implementation process of "selecting the third neural network corresponding to the third video frame from the plurality of neural networks", refer to the descriptions of step 1003 in the embodiment corresponding to FIG. 10A. Details are not described herein again.

The third neural network includes an entropy decoding layer and a decoding network, the entropy decoding layer is used to perform entropy decoding on the first compression information of the current video frame based on a reference frame of the current video frame, and the decoding network is used to generate the reconstructed frame of the current video frame based on a first feature of the current video frame. For a specific implementation in which the decoder decompresses the first compression information of the third video frame by using the third neural network, refer to the descriptions of step 702 in the embodiment corresponding to FIG. 7A. Details are not described herein again.

The first compression information includes compression information of the first feature of the third video frame, a reference frame of the third video frame is used for a decompression process of the first compression information, to obtain the first feature of the third video frame, and the first feature of the third video frame is used for a generation process of the reconstructed frame of the third video frame. A current video sequence includes both the reconstructed frame of the third video frame and the reference frame of the third video frame. In other words, after decompressing the first compression information, the decoder can obtain the reconstructed frame of the third video frame without the reference frame of the third video frame.

Further, for a meaning of "the first feature of the third video frame", refer to the meaning of "the first feature of the current video frame". For a meaning of "the reference frame of the third video frame", refer to the meaning of "the reference frame of the current video frame". Details are not described herein again. The reconstructed frame of the third video frame is a video frame that corresponds to the third video frame and that is obtained by decompressing the first compression information.

1104: The decoder decompresses second compression information of a fourth video frame by using a fourth neural network, to obtain a reconstructed frame of the fourth video frame.

In this embodiment of this application, the decoder selects the fourth neural network from the plurality of neural networks, to decompress the first compression information of the fourth video frame. For a specific implementation process of "selecting the fourth neural network corresponding to the fourth video frame from the plurality of neural networks", refer to the descriptions of step 1003 in the embodiment corresponding to FIG. 10A. Details are not described herein again.

The fourth neural network includes an entropy decoding layer and a convolutional network, the entropy decoding layer is used to perform entropy decoding on the second compression information, and the convolutional network is used to perform a generation process of the reconstructed frame of the current video frame based on the reference frame of the current video frame and a second feature of the current video frame. For a specific implementation in which the decoder decompresses the second compression information of the fourth video frame by using the fourth neural network, refer to the descriptions of step 704 in the embodiment corresponding to FIG. 7A. Details are not described herein again.

The second compression information includes compression information of the second feature of the fourth video frame, the second compression information is used by the decoder to perform decompression, to obtain the second feature of the fourth video frame, and the reference frame of the fourth video frame and the second feature of the fourth video frame are used for the generation process of the reconstructed frame of the fourth video frame. The current video sequence includes both the reconstructed frame of the fourth video frame and the reference frame of the fourth video frame.

Further, for a meaning of "the second feature of the fourth video frame", refer to the meaning of "the second feature of the current video frame". For a meaning of "the reference frame of the fourth video frame", refer to the meaning of "the reference frame of the current video frame". Details are not described herein again. The reconstructed frame of the fourth video frame is a video frame that corresponds to the fourth video frame and that is obtained by decompressing the second compression information.

2. Training Phase

FIG. 12 is a schematic flowchart of a method for training a video frame compression and decompression system according to an embodiment of this application. The method for training a video frame compression and decompression system according to an embodiment of this application may include the following steps.

1201: A training device performs compression encoding on a first training video frame by using a first neural network, to obtain first compression information corresponding to the first training video frame.

In this embodiment of this application, the training device stores a training data set in advance, and the training data set includes a plurality of first training video frame. For a specific implementation of step 1201, refer to descriptions of step 801 in the embodiment corresponding to FIG. 8. Details are not described herein again. A difference lies in that the "third video frame" in step 801 is replaced with the "first training video frame" in this embodiment, and that in step 1201, the training device does not need to select a target neural network from a first neural network and a second neural network. In other words, in step 1201, the training device does not need to select target compression information from first compression information and second compression information.

1202: The training device decompresses the first compression information of the first training video frame by using a third neural network, to obtain a first training reconstructed frame.

For a specific implementation in which the training device performs step 1202 in this embodiment of this application, refer to descriptions of step 1103 in the embodiment corresponding to FIG. 11. Details are not described herein again. A difference lies in that the "third video frame" in step 1103 is replaced with the "first training video frame" in this embodiment, and that in step 1202, the training device does not need to select a target neural network from a third neural network and a fourth neural network.

1203: The training device trains the first neural network and the third neural network based on the first training video frame, the first training reconstructed frame, the first compression information, and a first loss function, until a preset condition is met.

In this embodiment of this application, the training device may perform iterative training on the first neural network and the third neural network based on the first training video frame, the first training reconstructed frame, the first compression information corresponding to the first training video frame, and the first loss function, until a convergence condition of the first loss function is met.

The first loss function includes a loss term of a similarity between the first training video frame and the first training reconstructed frame and a loss term of a data size of the first compression information of the first training video frame, and the first training reconstructed frame is a reconstructed frame of the first training video frame. A training objective of the first loss function includes increasing the similarity between the first training video frame and the first training reconstructed frame. The training objective of the first loss function further includes reducing a size of first compression information of the first training video frame. The first neural network is a neural network used to perform compression encoding on a video frame. The second neural network is a neural network used to perform decompression based on compression information.

Specifically, the training device may calculate a function value of the first loss function based on the first training video frame, the first training reconstructed frame, and the first compression information corresponding to the first training video frame; generate a gradient value based on the function value of the first loss function; and perform reverse updating on weight parameters of the first neural network and the third neural network, to complete one time of training of the first neural network and the third neural network. The training device repeatedly performs step 1201 to step 1203, to implement iterative training of the first neural network and the third neural network.

1204: The training device performs compression encoding, by using a second neural network, on a second training video frame based on a reference frame of the second training video frame, to obtain second compression information corresponding to the second training video frame, where the reference frame of the second training video frame is a video frame processed by a trained first neural network.

For a specific implementation in which the training device performs step 1202 in this embodiment of this application, refer to descriptions of step 802 in the embodiment corresponding to FIG. 8. Details are not described herein again. A difference lies in that the "fourth video frame" in step 802 is replaced with the "second training video frame" in this embodiment, and that in step 1204, the training device does not need to select a target neural network from a first neural network and a second neural network. In other words, in step 1204, the training device does not need to select target compression information from first compression information and second compression information.

The reference frame of the second training video frame may be an original video frame in the training data set, or may be a video frame processed by a mature first neural network (namely, a trained first neural network).

Specifically, in an implementation, because the first neural network includes a first encoding network, and the third neural network includes a first decoding network, the training device may input an original reference frame of the second training video frame to the first encoding network in the mature first neural network (namely, a trained first neural network), to encode the second training video frame, so as to obtain an encoding result; and input the encoding result to the first decoding network in the mature third neural network (namely, a trained third neural network), to decode the encoding result, so as to obtain a processed reference frame of the second training video frame. Further, the training device inputs the second training video frame and the processed reference frame of the second training video frame to the second neural network, to generate, by using the second neural network, the second compression information corresponding to the second training video frame.

In another implementation, the training device may input an original reference frame of the second training video frame to the mature first neural network, to generate, by using the mature first neural network, first compression information corresponding to the original reference frame of the second training video frame; and perform decompression, by using the mature third neural network, based on the first compression information corresponding to the original reference frame of the second training video frame, to obtain the processed reference frame of the second training video frame. Further, the training device inputs the second training video frame and the processed reference frame of the second training video frame to the second neural network, to generate, by using the second neural network, the second compression information corresponding to the second training video frame.

In this embodiment of this application, in an execution phase, because the reference frame used by the second neural network may be processed by the first neural network, the reference frame processed by the first neural network is used to train the second neural network. This helps maintain consistency between a training phase and the execution phase, to improve accuracy of the execution phase.

1205: The training device decompresses the second compression information of the second training video frame by using a fourth neural network, to obtain a second training reconstructed frame.

For a specific implementation in which the training device performs step 1202 in this embodiment of this application, refer to descriptions of step 1104 in the embodiment corresponding to FIG. 11. Details are not described herein again. A difference lies in that the "fourth video frame" in step 1104 is replaced with the "second training video frame" in this embodiment, and that in step 1205, the training device does not need to select a target neural network from a third neural network and a fourth neural network.

1206: The training device trains the second neural network and the fourth neural network based on the second training video frame, the second training reconstructed frame, the second compression information, and a second loss function, until a preset condition is met.

In this embodiment of this application, the training device may perform iterative training on the second neural network and the fourth neural network based on the second training video frame, the second training reconstructed frame, the second compression information corresponding to the second training video frame, and the second loss function, until a convergence condition of the second loss function is met.

The second loss function includes a loss term of a similarity between the second training video frame and the second training reconstructed frame and a loss term of a data size of the second compression information of the second training video frame, and the second training reconstructed frame is a reconstructed frame of the second training video frame. A training objective of the second loss function includes increasing the similarity between the second training video frame and the second training reconstructed frame. The training objective of the second loss function further includes reducing a size of second compression information of the second training video frame. The second neural network is a neural network used to perform compression encoding on a video frame. The fourth neural network is a neural network used to perform decompression based on compression information.

Specifically, the training device may calculate a function value of the second loss function based on the second training video frame, the second training reconstructed frame, and the second compression information corresponding to the second training video frame; generate a gradient value based on the function value of the second loss function; and perform reverse updating on weight parameters of the second neural network and the fourth neural network, to complete one time of training of the second neural network and the fourth neural network. The training device repeatedly performs step 1204 to step 1206, to implement iterative training of the second neural network and the fourth neural network.

Because both the first neural network and the third neural network include a plurality of independent neural network modules, correspondingly, the second neural network and the fourth neural network also include a plurality of independent neural network modules. The independent neural network module is a neural network module with an independent function. For example, the first encoding network in the first neural network is an independent neural network module. For another example, a first decoding network in the second neural network is an independent neural network module.

Optionally, if the second neural network and the fourth neural network have a same neural network module as the first neural network and the third neural network, parameters of the second neural network and the fourth neural network may first be initialized based on the trained first neural network and the trained third neural network. In other words, parameters of the trained first neural network and the trained third neural network are assigned to the same neural network module, and the parameters of the same neural network module remain unchanged in a training process of the second neural network and the fourth neural network. Parameters of remaining neural network modules in the second neural network and the fourth neural network are adjusted, to reduce total duration of the training processes of the second neural network and the fourth neural network, and improve training efficiency of the second neural network and the fourth neural network.

This embodiment of this application provides both an execution process of the neural network and a training process of the neural network. This extends an application scenario of the solution, and improves comprehensiveness of the solution.

To more intuitively understand beneficial effect brought by embodiments of this application, the following further describes the beneficial effect brought by embodiments of this application with reference to the accompanying drawings. In this experiment, for example, each time a video frame is compressed by using a first neural network, the video frame is compressed by using a second neural network. Table 1 shows experimental data.

TABLE 1

| Resolution | Use only a second neural network | |
| | PSNR | MSSSIM |
| --- | --- | --- |
| 1920 × 1080 | −37.73% | −23.25% |
| 832 × 480 | −36.45% | −20.28% |
| 416 × 240 | −35.69% | −22.18% |

Refer to Table 1. It can be learned that, in three groups of video sequences with different resolutions, video frames in the video sequence that are compressed by using the solution in embodiments of this application have higher picture quality than video frames in the video sequence that are compressed by using only the second neural network.

In this experiment, for example, an offset and a slope of a first fitting formula are generated, an offset and a slope of a second fitting formula are generated, and the offset and the slope of the first fitting formula and the offset and the slope of the second fitting formula are continuously updated. Table 2 shows experimental data.

TABLE 2

| Resolution | Use only a second neural network | |
| | PSNR | MSSSIM |
| --- | --- | --- |
| 832 × 480 | −3.45% | −2.28% |
| 416 × 240 | −3.59% | −2.18% |

Refer to Table 2. It can be learned that, in two groups of video sequences with different resolutions, video frames in the video sequence that are compressed by using the solution in embodiments of this application have higher picture quality than video frames in the video sequence that are compressed by using only the second neural network.

Figure 13:
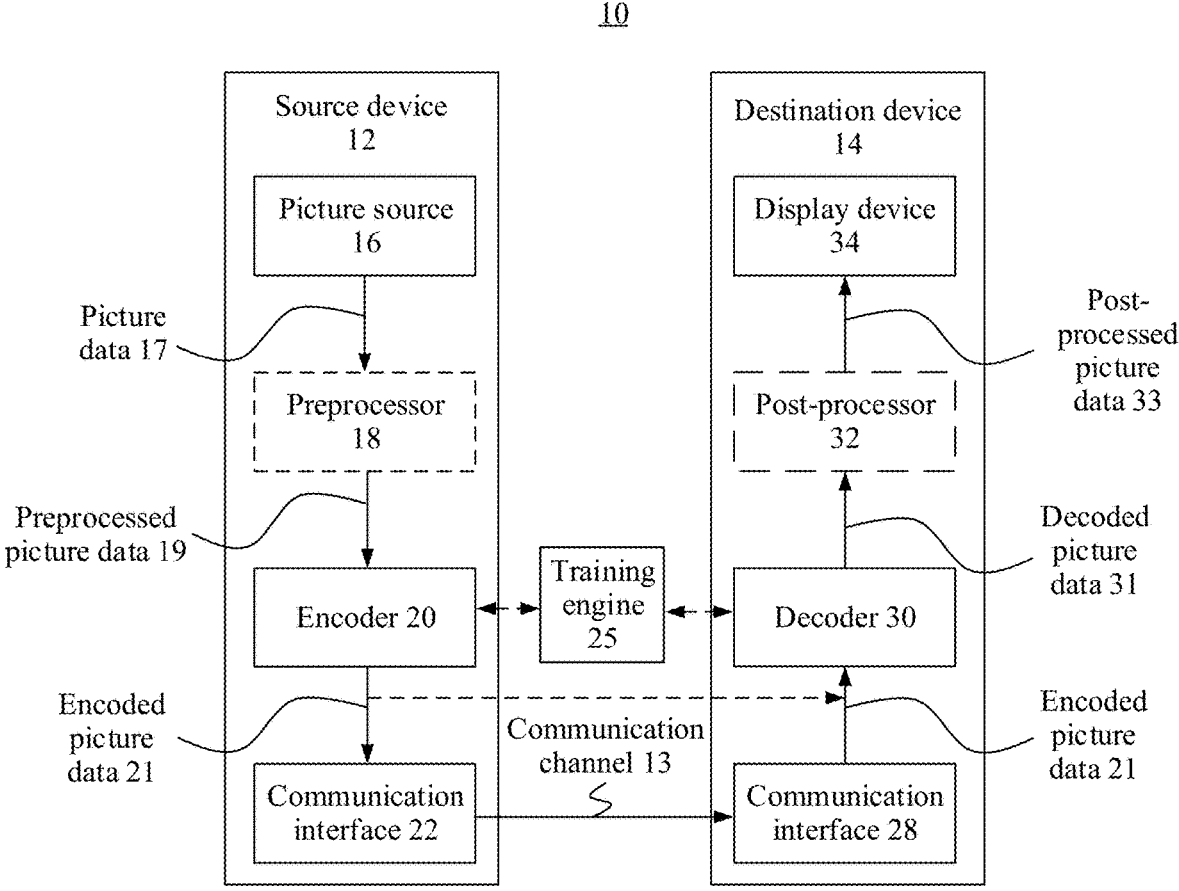
FIG. 13 is a diagram of a system architecture of a video encoding/decoding system according to an embodiment of this application.

An embodiment of this application further provides a video encoding/decoding system. FIG. 13 is a diagram of a system architecture of the video encoding/decoding system according to an embodiment of this application. FIG. 13 is a schematic block diagram of an example of a video encoding/decoding system 10. A video encoder 20 (or an encoder 20 for short) and a video decoder 30 (or a decoder 30 for short) in the video encoding/decoding system 10 represent devices that may be used to perform various technologies based on various examples described in this application.

As shown in FIG. 13, the video encoding/decoding system 10 includes a source device 12. The source device 12 is configured to provide encoded picture data 21 such as an encoded picture to a destination device 14 configured to decode the encoded picture data 21.

The source device 12 includes the encoder 20, and may optionally include a picture source 16, a preprocessor (or a preprocessing unit) 18 such as a picture preprocessor, and a communication interface (or a communication unit) 22.

The picture source 16 may include or may be any type of picture capturing device configured to capture a picture in the real world, and/or any type of picture generation device, for example, a computer graphics processor configured to generate a computer animated picture, or any type of device configured to obtain and/or provide a picture in the real world, a computer generated picture (for example, content on a screen, a virtual reality (VR) picture, and/or any combination thereof (for example, an augmented reality (AR) picture). The picture source may be any type of memory or storage that stores any of the foregoing pictures.

To distinguish processing performed by the preprocessor (or a preprocessing unit) 18, a picture (or picture data 17) may also be referred to as an original picture (or original picture data) 17.

The preprocessor 18 is configured to receive the (original) picture data 17, and preprocess the picture data 17, to obtain a preprocessed picture (or preprocessed picture data) 19. For example, preprocessing performed by the preprocessor 18 may include trimming, color format conversion (for example, from RGB to YCbCr), color correction, or denoising. It may be understood that the preprocessing unit 18 may be an optional component.

The video encoder (or the encoder) 20 is configured to receive the preprocessed picture data 19, and provide the encoded picture data 21.

The communication interface 22 in the source device 12 may be configured to receive the encoded picture data 21, and send the encoded picture data 21 (or any other processed version) to another device such as the destination device 14 or any other device through a communication channel 13 for storage or direct reconstruction.

The destination device 14 includes the decoder 30, and may optionally include a communication interface (or a communication unit) 28, a post-processor (or a post-processing unit) 32, and a display device 34.

The communication interface 28 in the destination device 14 is configured to directly receive the encoded picture data 21 (or any other processed version) from the source device 12 or from any other source device such as a storage device. For example, the storage device is a device for storing encoded picture data, and provides the encoded picture data 21 to the decoder 30.

The communication interface 22 and the communication interface 28 may be configured to send or receive the encoded picture data (or the encoded data) 21 through a direct communication link, for example, direct wired or wireless connection, between the source device 12 and the destination device 14, or through any type of network, for example, a wired network, a wireless network, or any combination of a wired network and a wireless network, any type of private network, any type of public network, or any combination of a private network and a public network.

For example, the communication interface 22 may be configured to encapsulate the encoded picture data 21 into an appropriate format such as a packet, and/or process the encoded picture data through any type of transmission encoding or processing for transmission through a communication link or a communication network.

The communication interface 28 corresponds to the communication interface 22, and for example, may be configured to receive transmission data, and process the transmission data through any type of corresponding transmission decoding or processing and/or decapsulation, to obtain the encoded picture data 21.

Both the communication interface 22 and the communication interface 28 may be configured as unidirectional communication interfaces as indicated by the arrow for the communication channel 13 in FIG. 13 pointing from the source device 12 to the destination device 14, or bi-directional communication interfaces, and may be configured to send and receive a message, to set up connection, and acknowledge and exchange any other information related to the communication link and/or data transmission, for example, encoded picture data transmission.

The video decoder (or the decoder) 30 is configured to receive the encoded picture data 21, and provide decoded picture data (or decoded picture data) 31. The decoded picture data may also be referred to as reconstructed picture data, a reconstructed frame of a video frame, or another name, and is picture data obtained after decompression is performed based on the encoded picture data 21.

The post-processor 32 is configured to perform post-processing on the decoded picture data 31 such as a decoded picture, to obtain post-processed picture data 33 such as a post-processed picture. Post-processing performed by the post-processor 32 may include, for example, color format conversion (for example, from YCbCr to RGB), color correction, trimming, or resampling, or any other processing for generating the decoded picture data 31 that is displayed by the display device 34.

The display device 34 is configured to receive the post-processed picture data 33, to display a picture to a user, a viewer, or the like. The display device 34 may be or may include any type of display, for example, an integrated or external display screen or display, configured to display a reconstructed picture. For example, the display screen may include a liquid crystal display (LCD), an organic light emitting diode (OLED) display, a plasma display, a projector, a micro LED display, a liquid crystal on silicon (LCoS), a digital light processor (DLP), or any type of another display screen.

The video encoding/decoding system 10 further includes a training engine 25. The training engine 25 is configured to train a neural network, namely, the first neural network, the second neural network, the third neural network, and the fourth neural network shown in the method embodiments, in the encoder 20 or the decoder 30. Training data may be stored in a database (not shown), and the training engine 25 performs training based on the training data, to obtain the neural network. It should be noted that a source of the training data is not limited in this embodiment of this application. For example, the training data may be obtained from a cloud or another place, to train the neural network.

The neural network obtained through training by the training engine 25 may be applied to the video encoding/decoding system 10 and a video encoding/decoding system 40, for example, applied to the source device 12 (for example, the encoder 20) or the destination device 14 (for example, the decoder 30) shown in FIG. 13. The training engine 25 may perform training on the cloud, to obtain the neural network, and then the video encoding/decoding system 10 downloads the neural network from the cloud, and uses the neural network.

Although FIG. 13 shows the source device 12 and the destination device 14 as independent devices, the device embodiments may alternatively include both the source device 12 and the destination device 14, or include functions of both the source device 12 and the destination device 14, that is, including both the source device 12 or a corresponding function and the destination device 14 or a corresponding function. In these embodiments, the source device 12 or the corresponding function and the destination device 14 or the corresponding function may be implemented by using same hardware and/or software or by using separate hardware and/or software or any combination thereof.

Based on the descriptions, existence and (accurate) division of different units or functions of the source device 12 and/or the destination device 14 shown in FIG. 13 may vary with actual devices and applications. This is obvious to a person skilled in the art.

Figure 14:
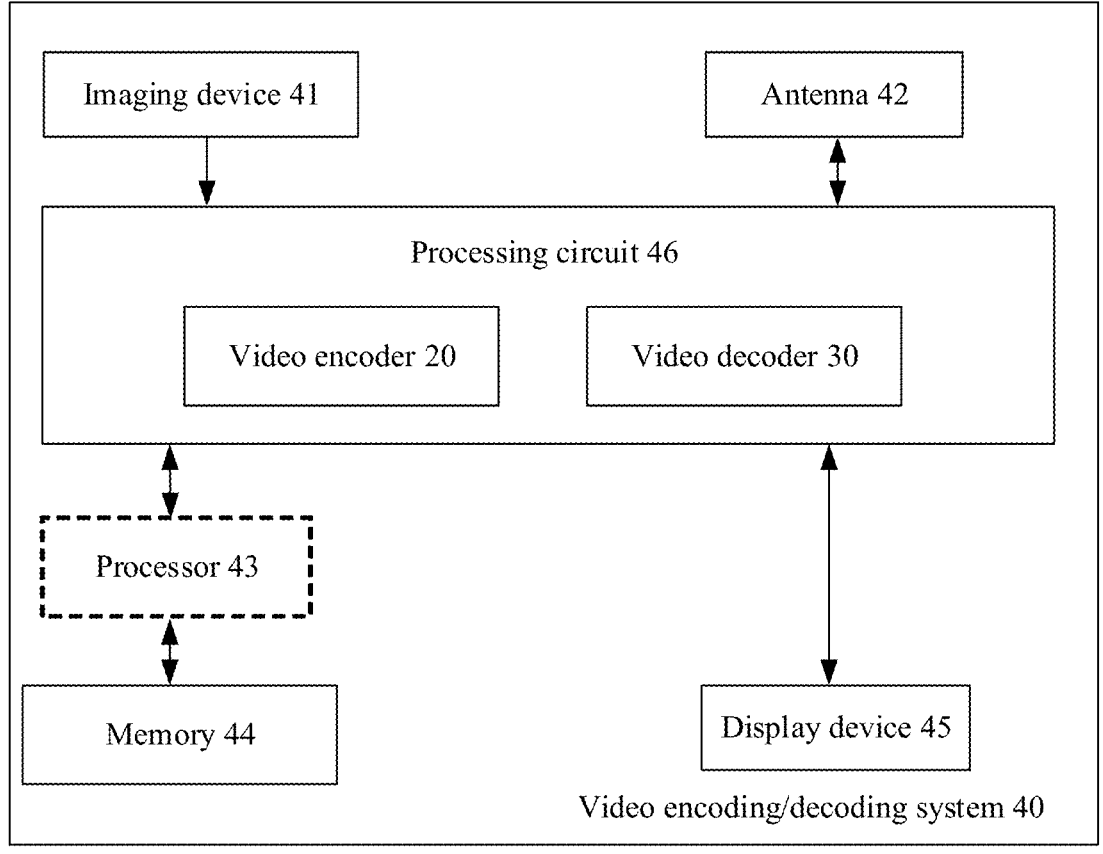
FIG. 14 is a diagram of another system architecture of a video encoding/decoding system according to an embodiment of this application.
Figures 15, 16:
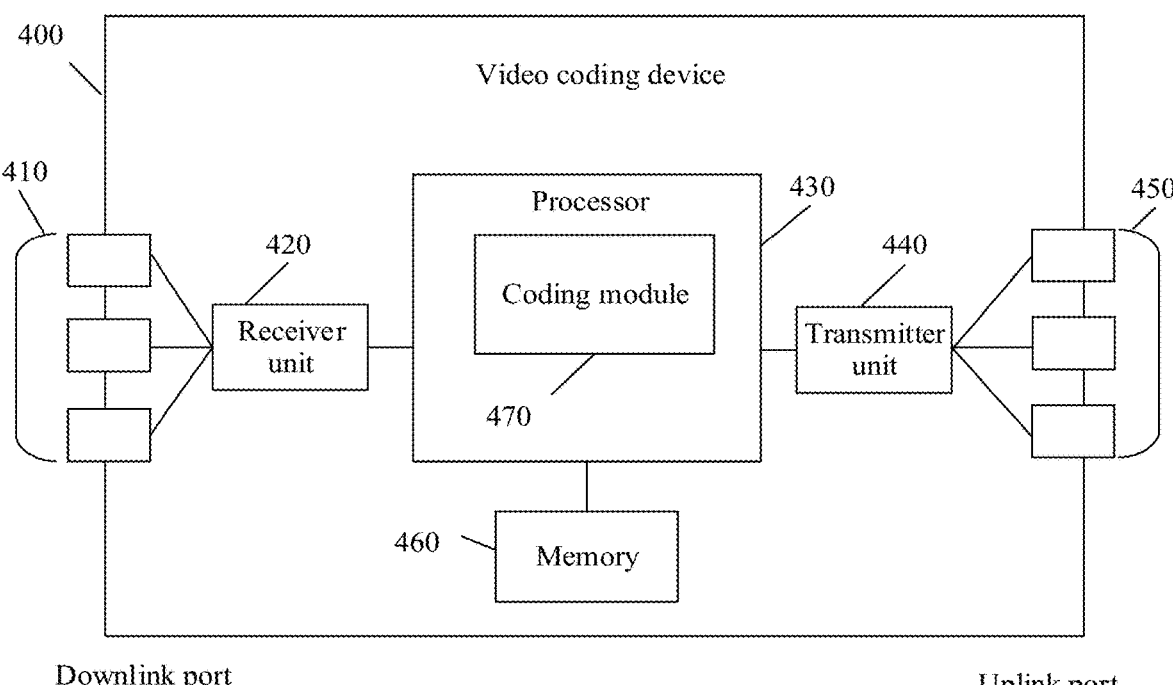
FIG. 15 is a schematic diagram of a video coding device according to an embodiment of this application.
FIG. 16 is a simplified block diagram of an apparatus according to an embodiment of this application.

FIG. 14 is a diagram of another system architecture of a video encoding/decoding system according to an embodiment of this application. The following is described with reference to FIG. 13. The encoder 20 (for example, the video encoder 20), the decoder 30 (for example, the video decoder 30), or both the encoder and the decoder may be implemented by using a processing circuit shown in FIG. 14, for example, one or more microprocessors, a digital signal processor (DSP), an ASIC, an FPGA, discrete logic, hardware, a dedicated processor for video encoding, or any combination thereof. The encoder 20 may be implemented by using a processing circuit 46, to include various modules described with reference to the encoder 20 in FIG. 14 and/or any other decoder system or subsystem described in the specification. The decoder 30 may be implemented by using the processing circuit 46, to include various modules described with reference to the decoder 30 in FIG. 15 and/or any other decoder system or subsystem described in the specification. The processing circuit 46 may be configured to perform various operations in the following. As shown in FIG. 16, if some technologies are implemented by using software, the device may store instructions of the software in an appropriate non-transitory computer-readable storage medium, and execute the instructions in hardware by using one or more processors, to perform the technologies in this application. As shown in FIG. 14, one of the video encoder 20 and the video decoder 30 may be integrated into a single device as a portion of a combined encoder/decoder (encoder/decoder, CODEC).

The source device 12 and the destination device 14 may include any one of various devices, including any type of handheld device or fixed device, for example, a notebook or a laptop computer, a mobile phone, a smartphone, a tablet or a tablet computer, a camera, a desktop computer, a set-top box, a television, a display device, a digital media player, a video game console, a video stream device (for example, a content service server or a content distribution server), a broadcast receiving device, a broadcast transmitting device, and the like, and may not use or may use any type of operating system. In some cases, the source device 12 and the destination device 14 may be equipped with components for wireless communication. Therefore, the source device 12 and the destination device 14 may be wireless communication devices.

In some cases, the video encoding/decoding system 10 shown in FIG. 13 is merely an example. The technologies provided in this application are applicable to video encoding setting (for example, video encoding or video decoding), and the setting does not necessarily include any data communication between an encoding device and a decoding device. In another example, data is retrieved from a local memory, and sent by using a network. The video encoding device may encode the data and store the data in the memory, and/or the video decoding device may retrieve the data from the memory and decode the data. In some examples, encoding and decoding are performed by devices that do not communicate with each other but encode data to the memory and/or retrieve data from the memory and decode the data.

FIG. 14 is a diagram of an example of the video encoding/decoding system 40 including the video encoder 20 and/or the video decoder 30 according to an example embodiment. The video encoding/decoding system 40 may include an imaging device 41, the video encoder 20, the video decoder 30 (and/or a video encoder/decoder implemented by using the processing circuit 46), an antenna 42, one or more processors 43, one or more memories 44, and/or a display device 45.

As shown in FIG. 14, the imaging device 41, the antenna 42, the processing circuit 46, the video encoder 20, the video decoder 30, the processor 43, the memory 44, and/or the display device 45 can communicate with each other. In different examples, the video encoding/decoding system 40 may include only the video encoder 20 or only the video decoder 30.

In some examples, the antenna 42 may be configured to transmit or receive an encoded bit stream of video data. In addition, in some examples, the display device 45 may be configured to present video data. The processing circuit 46 may include ASIC logic, a graphics processor, a general-purpose processor, and the like. The video encoding/decoding system 40 may also include the optional processor 43. Similarly, the optional processor 43 may include ASIC logic, a graphics processor, a general-purpose processor, and the like. In addition, the memory 44 may be any type of memory, for example, a volatile memory (for example, a static random-access memory (SRAM), or a dynamic random-access memory (DRAM), or a non-volatile memory (for example, a flash memory). In a non-limiting example, the memory 44 may be implemented by using a cache memory. In another example, the processing circuit 46 may include a memory (for example, a cache) configured to implement a picture buffer.

In some examples, the video encoder 20 implemented by using a logic circuit may include a picture buffer (for example, implemented by using the processing circuit 46 or the memory 44) and a graphics processing unit (for example, implemented by using the processing circuit 46). The graphics processing unit may be communicatively coupled to the picture buffer. The graphics processing unit may include the video encoder 20 implemented by using the processing circuit 46, to implement the video decoder 20 shown in FIG. 14 and/or various modules described with reference to any other encoder system or subsystem described in the specification. The logic circuit may be configured to perform various operations in the specification.

In some examples, the video decoder 30 may be implemented by using the processing circuit 46 in a similar manner, to implement the video decoder 30 shown in FIG. 14 and/or various modules described with reference to any other decoder system or subsystem described in the specification. In some examples, the video decoder 30 implemented by using the logic circuit may include a picture buffer (for example, implemented by using the processing circuit 46 or the memory 44) and a graphics processing unit (for example, implemented by using the processing circuit 46). The graphics processing unit may be communicatively coupled to the picture buffer. The graphics processing unit may include the video decoder 30 implemented by using the processing circuit 46.

In some examples, the antenna 42 may be configured to receive an encoded bit stream of video data. As described above, the encoded bit stream may include data, an indicator, an index value, mode selection data, and the like, for example, data (for example, a transform coefficient or a quantized transform coefficient, the (described) optional indicator, and/or data defining encoding partition) related to encoding partition, that are related to video frame encoding. The video encoding/decoding system 40 may also include the video decoder 30 that is coupled to the antenna 42 and that is configured to decode the encoded bit stream. The display device 45 is configured to present a video frame.

It should be understood that, for the example described with reference to the video encoder 20 in this embodiment of this application, the video decoder 30 may be configured to perform a reverse process. For a signaling syntax element, the video decoder 30 may be configured to receive and parse the syntax element, and decode related video data accordingly. In some examples, the video encoder 20 may perform entropy encoding on the syntax element, to obtain an encoded video bit stream. In the example, the video decoder 30 may parse the syntax element, and decode related video data accordingly.

It should be noted that the encoding/decoding process described in this application exists in most video encoders/decoders, for example, H.263, H.264, Moving Pictures Experts Group (MPEG)-2, MPEG-4, VP8, VP9, and AI-based end-to-end picture encoding.

FIG. 15 is a schematic diagram of a video coding device 400 according to an embodiment of this application. The video coding device 400 is applicable to implementation of the disclosed embodiments described in the specification. In an embodiment, the video coding device 400 may be a decoder, for example, the video decoder 30 in FIG. 14, or may be an encoder, for example, the video encoder 20 in FIG. 14.

The video coding device 400 includes an ingress port 410 (or an input port 410) and a receiver unit (Rx) 420 that are configured to receive data; a processor, a logical unit, or a CPU 430 that is configured to process data; a transmitter unit (Tx) 440 and an egress port 450 (or an output port 450) that are configured to transmit data; and a memory 460 configured to store data. For example, the processing unit 430 may be a neural network processing unit 430. The video coding device 400 may also include an optical-to-electrical (OE) component and an electrical-to-optical (EO) component that are coupled to the ingress port 410, the receiver unit 420, the transmitter unit 440, and the egress port 450 and that are used as an outlet or an inlet for an optical signal or an electrical signal.

The processing unit 430 is implemented by using hardware and software. The processing unit 430 may be implemented as one or more processor chips, a core (for example, a multi-core processor), an FPGA, an ASIC, and a DSP. The processing unit 430 communicates with the ingress port 410, the receiver unit 420, the transmitter unit 440, the egress port 450, and the memory 460. The processing unit 430 includes a coding module 470 (for example, a neural network NN-based coding module 470). The coding module 470 implements the embodiments disclosed above. For example, the coding module 470 performs, processes, prepares, or provides various encoding operations. Therefore, substantial improvement is brought by using the coding module 470 for functions of the video coding device 400, and switching of the video coding device 400 to different states is affected. Alternatively, the coding module 470 is implemented by using instructions stored in the memory 460 and executed by the processing unit 430.

The memory 460 includes one or more disks, a tape drive, and a solid-state drive, may be used as an overflow data storage device, and is configured to store a program when the program is executed, and store instructions and data that are read when the program is executed. The memory 460 may be volatile and/or non-volatile, and may be a read-only memory (ROM), a RAM, a ternary content-addressable memory (TCAM), and/or an SRAM.

FIG. 16 is a simplified block diagram of an apparatus 500 according to an example embodiment. The apparatus 500 may be used as any one or two of the source device 12 and the destination device 14 in FIG. 13.

A processor 502 in the apparatus 500 may be a central processing unit. Alternatively, the processor 502 may be any other type of device, or a plurality of devices, capable of manipulating or processing information now-existing or hereafter developed. Although the disclosed implementations may be implemented by using a single processor such as the processor 502 shown the figure, it is faster and more efficient to use more than one processor.

In an implementation, a memory 504 in the apparatus 500 may be a ROM device or a RAM device. Any other appropriate type of storage device may be used as the memory 504. The memory 504 may include code and data 506 that are accessed by the processor 502 by using a bus 512. The memory 504 may further include an operating system 508 and an application program 510. The application program 510 includes at least one program that allows the processor 502 to perform the method described in the specification. For example, the application program 510 may include applications 1 to N, and may further include a video coding application that performs the method described in the specification.

The apparatus 500 may further include one or more output devices, for example, a display 518. For example, the display 518 may be a touch-sensitive display that combines the display with a touch-sensitive element that may be configured to sense a touch input. The display 518 may be coupled to the processor 502 by using the bus 512.

Although the bus 512 in the apparatus 500 is described herein as a single bus, the bus 512 may include a plurality of buses. Further, an auxiliary memory may be directly coupled to another component in the apparatus 500 or accessed through a network, and may include a single integrated unit such as a memory card or a plurality of units such as a plurality of memory cards. Therefore, the apparatus 500 may have various configurations.

What is claimed is:

1. An encoder, comprising:
a non-transitory computer-readable storage medium configured to store programming instructions; and
one or more processors coupled to the non-transitory computer-readable storage medium and configured to execute the programming instructions to cause the encoder to:
select a target neural network from a plurality of neural networks according to a network selection policy, wherein the plurality of neural networks comprises a first neural network and a second neural network, wherein the second neural network comprises a convolutional network and a second entropy encoding layer, and wherein the convolutional network comprises a plurality of convolutional layers and an activation rectified linear unit (ReLU) layer; and
perform compression encoding on a current video frame using the target neural network in order to obtain compression information corresponding to the current video frame,
wherein when the first neural network is the target neural network, the compression information comprises first compression information of a first feature of the current video frame, and the compression encoding uses a reference frame of the current video frame for a compression process of the first feature, and
wherein when the second neural network is the target neural network,
the compression information comprises second compression information of a residual of the current video frame, the compression encoding uses the reference frame of the current video frame for a generation process of the residual, the convolutional network obtains the residual based on the reference frame of the current video frame, and the second entropy encoding layer performs entropy encoding on the residual of the current video frame in order to output the second compression information.

2. The encoder of claim 1, wherein the first neural network comprises an encoding network and a first entropy encoding layer, the encoding network obtains the first feature from the current video frame, and the first entropy encoding layer performs entropy encoding on the first feature based on the reference frame of the current video frame in order to output the first compression information.

3. The encoder of claim 2, wherein when the target neural network is the first neural network, the one or more processors are further configured to execute the programming instructions to cause the encoder to:
obtain, using the encoding network, the first feature from the current video frame;

predict, using the first entropy encoding layer, the first feature based on the reference frame of the current video frame in order to generate a predicted result of the first feature;

generate, using the first entropy encoding layer, a probability distribution of the first feature based on the predicted result of the first feature; and perform entropy encoding, using the first entropy encoding layer, on the first feature based on the probability distribution of the first feature in order to obtain the first compression information.

4. The encoder of claim 1, wherein the network selection policy is related to one or more of location information of the current video frame or a data amount carried in the current video frame.

5. The encoder of claim 4, wherein the one or more processors are configured to execute the programming instructions to cause the encoder to further select the target neural network from the plurality of neural networks according to the network selection policy by selecting the target neural network from the plurality of neural networks based on the location information of the current video frame in a current video sequence, wherein the location information indicates that the current video frame is an $X^{th}$ frame in the current video sequence.

6. The encoder of claim 4, wherein the one or more processors are configured to execute the programming instructions to cause the encoder to further select the target neural network from the plurality of neural networks according to the network selection policy by selecting the target neural network from the plurality of neural networks based on an attribute of the current video frame, wherein the attribute of the current video frame indicates the data amount carried in the current video frame, and wherein the attribute of the current video frame comprises any one or more of an entropy, a contrast, or a saturation of the current video frame.

7. The encoder of claim 1, wherein the one or more processors are further configured to execute the programming instructions to cause the encoder to:

generate indication information corresponding to the compression information, wherein the indication information indicates that the compression information is obtained using the target neural network; and send the indication information to a decoder.

8. An encoder, comprising:

a non-transitory computer-readable storage medium configured to store programming instructions; and one or more processors coupled to the non-transitory computer-readable storage medium and configured to execute the programming instructions to cause the encoder to:

perform compression encoding on a current video frame using a first neural network and a reference frame of the current video frame in order to obtain first compression information of a first feature of the current video frame;

generate a first video frame using the first neural network, wherein the first video frame is a first reconstructed frame of the current video frame;

perform compression encoding on the current video frame using a second neural network and the reference frame of the current video frame in order to obtain second compression information of a second feature of the current video frame, wherein the second neural network comprises a convolutional network and a second entropy encoding layer, wherein the convolutional network comprises a plurality of convolutional layers and an activation rectified linear unit (ReLU) layer, wherein the convolutional network obtains a residual of the current video frame based on the reference frame of the current video frame, and wherein the second entropy encoding layer performs entropy encoding on the residual of the current video frame in order to output the second compression information;

generate a second video frame using the second neural network, wherein the second video frame is a second reconstructed frame of the current video frame; and determine, using either the first neural network or the second neural network and based on the first compression information, the first video frame, the second compression information, and the second video frame, compression information corresponding to the current video frame, wherein the compression information is the first compression information when using the first neural network, and wherein the compression information is the second compression information when using the second neural network.

9. The encoder of claim 8, wherein the first neural network comprises an encoding network and a first entropy encoding layer, wherein the encoding network obtains the first feature from the current video frame, and wherein the first entropy encoding layer performs entropy encoding on the first feature in order to output the first compression information.

10. The encoder of claim 8, wherein the one or more processors are further configured to execute the programming instructions to cause the encoder to:

generate indication information corresponding to the compression information, wherein the indication information indicates that the compression information is obtained using the first neural network or the second neural network; and send the indication information to a decoder.

11. An encoder, comprising:

a non-transitory computer-readable storage medium configured to store programming instructions; and one or more processors coupled to the non-transitory computer-readable storage medium and configured to execute the programming instructions to cause the encoder to:

perform compression encoding on a third video frame using a first neural network and a first reference frame of the third video frame in order to obtain first compression information of a first feature of the third video frame; and perform compression encoding on a fourth video frame using a second neural network and a second reference frame of the fourth video frame in order to obtain second compression information of a second feature of the fourth video frame, wherein the second neural network comprises a convolutional network and a second entropy encoding layer, wherein the convolutional network comprises a plurality of convolutional layers and an activation rectified linear unit (ReLU) layer, wherein the convolutional network obtains a residual of a current video frame based on a third reference frame of the current video frame, and wherein the second entropy encoding layer performs entropy encoding on the residual of the current video frame in order to output the second compression information, and wherein the third video frame and the fourth video frame are different video frames in a same video sequence.

12. The encoder of claim 11, wherein the first neural network comprises an encoding network and a first entropy encoding layer, wherein the encoding network obtains the first feature from the current video frame, and wherein the first entropy encoding layer performs entropy encoding on the first feature in order to output the first compression information.

13. The encoder of claim 11, wherein the one or more processors are further configured to execute the programming instructions to cause the encoder to:

generate indication information corresponding to the compression information, wherein the indication information indicates that the compression information is obtained using the first neural network or the second neural network; and send the indication information to a decoder.

14. A decoder, comprising:

a non-transitory computer-readable storage medium configured to store programming instructions; and one or more processors coupled to the non-transitory computer-readable storage medium and configured to execute the programming instructions to cause the decoder to:

obtain compression information of a current video frame;

select, from a plurality of neural networks, a target neural network corresponding to the current video frame, wherein the plurality of neural networks comprises a third neural network and a fourth neural network, wherein the fourth neural network comprises a convolutional network and a first entropy decoding layer, and wherein the convolutional network comprises a plurality of convolutional layers and an activation rectified linear unit (ReLU) layer;

perform decompression, using the target neural network and based on the compression information, to obtain a reconstructed frame of the current video frame, wherein when the target neural network is the third neural network, the compression information comprises first compression information of a first feature of the current video frame, the decompression is on the first compression information and uses a reference frame of the current video frame for a decompression process of the first compression information in order to obtain the first feature;

perform, using the first feature, a generation process of the reconstructed frame of the current video frame, wherein when the target neural network is the fourth neural network, the compression information comprises second compression information of a second feature of the current video frame, the decoder performs the decompression using the second compression information in order to obtain the second feature; and perform, using the reference frame of the current video frame and the second feature, the generation process of the reconstructed frame of the current video frame.

15. The decoder of claim 14, wherein the third neural network comprises a second entropy decoding layer and a decoding network, wherein the second entropy decoding layer performs entropy decoding on the first compression information of the current video frame based on the reference frame of the current video frame, and wherein the decoding network generates the reconstructed frame of the current video frame based on the first feature.

16. The decoder of claim 14, wherein the one or more processors are configured to execute the programming instructions to cause the decoder to further select the target neural network corresponding to the current video frame by:

obtaining indication information corresponding to the compression information; and selecting the target neural network from the plurality of neural networks based on the indication information.

17. The decoder of claim 14, wherein the first entropy decoding layer performs entropy decoding on the second compression information, and the convolutional network performs the generation process of a third reconstructed frame of the current video frame based on the reference frame of the current video frame and the second feature.

18. A decoder, comprising:

a non-transitory computer-readable storage medium configured to store programming instructions; and one or more processors coupled to the non-transitory computer-readable storage medium and configured to execute the programming instructions to cause the decoder to:

decompress first compression information of a third video frame using a third neural network and a first reference frame of the third video frame in order to obtain a first reconstructed frame of the third video frame, wherein the first compression information comprises third compression information of a first feature of the third video frame;

perform, using the first feature, a generation process of the first reconstructed frame;

decompress second compression information of a fourth video frame using a fourth neural network and the second compression information in order to obtain a second reconstructed frame of the fourth video frame, wherein the second compression information comprises fourth compression information of a second feature of the fourth video frame, wherein the fourth neural network comprises a convolutional network and a fourth entropy decoding layer, and wherein the convolutional network comprises a plurality of convolutional layers and an activation rectified linear unit (ReLU) layer; and perform, using a second reference frame of the fourth video frame and the second feature, the generation process of the second reconstructed frame.

19. The decoder of claim 18, wherein the third neural network comprises a third entropy decoding layer and a decoding network, wherein the third entropy decoding layer performs entropy decoding on the first compression information of a current video frame based on a third reference frame of the current video frame, and wherein the decoding network generates a third reconstructed frame of the current video frame based on the first feature.

20. The decoder of claim 18, wherein the fourth entropy decoding layer performs entropy decoding on the second compression information, and wherein the convolutional network performs the generation process of a third reconstructed frame of a current video frame based on a third reference frame of the current video frame and the second feature.

* * * * *